(12) United States Patent
Huntzinger

(10) Patent No.: US 9,216,763 B2
(45) Date of Patent: Dec. 22, 2015

(54) PERSONAL MOBILITY DEVICE

(75) Inventor: Timothy Huntzinger, San Marcos, CA (US)

(73) Assignee: Timothy Huntzinger, San Marcos, CA (US)

( * ) Notice: Subject to any disclaimer, the term of this patent is extended or adjusted under 35 U.S.C. 154(b) by 0 days.

(21) Appl. No.: 13/818,959

(22) PCT Filed: Sep. 1, 2011

(86) PCT No.: PCT/US2011/050246
§ 371 (c)(1),
(2), (4) Date: Feb. 25, 2013

(87) PCT Pub. No.: WO2012/031150
PCT Pub. Date: Mar. 8, 2012

(65) Prior Publication Data
US 2013/0153311 A1   Jun. 20, 2013

Related U.S. Application Data

(60) Provisional application No. 61/379,268, filed on Sep. 1, 2010.

(51) Int. Cl.
| | |
|---|---|
| *B60K 7/00* | (2006.01) |
| *B62D 9/02* | (2006.01) |
| *B62K 5/10* | (2013.01) |
| *B60G 3/08* | (2006.01) |
| *B60G 17/015* | (2006.01) |
| *B62D 9/04* | (2006.01) |

(52) U.S. Cl.
CPC .. *B62D 9/02* (2013.01); *B60G 3/08* (2013.01); *B60G 17/015* (2013.01); *B60K 7/00* (2013.01); *B62D 9/04* (2013.01); *B60G 2200/132* (2013.01); *B60G 2204/30* (2013.01); *B60G 2204/421* (2013.01); *B60G 2300/122* (2013.01);
(Continued)

(58) Field of Classification Search
CPC .............. B62K 5/10; B62D 9/04; B62D 9/02; B60K 7/00; B60G 2200/132; B60G 2204/30; B60G 2204/421; B60G 2300/13; B60G 2300/45; B60G 2300/122; B60G 2300/124; B60G 21/007
USPC .................. 280/124.103, 124.128, 5.509, 755
See application file for complete search history.

(56) References Cited

U.S. PATENT DOCUMENTS 3,408,088 A * 10/1968 Corbin ................... 280/124.106
7,426,970 B2   9/2008 Olsen
(Continued)

FOREIGN PATENT DOCUMENTS

| EP | 1332779 A2 * | 11/2003 |
|---|---|---|
| JP | 2004090822 | 3/2004 |
| WO | WO 02/44008 A2 * | 6/2002 |

*Primary Examiner* — Ruth Ilan
(74) *Attorney, Agent, or Firm* — Kirton McConkie; Evan R. Witt

(57) ABSTRACT

A personal mobility vehicle is described. Generally, the vehicle includes a vehicle frame with multiple wheels rotatably connected thereto. The vehicle further includes one or more components that allow the vehicle to be leanable, yet stable. In this regard, such components may include: a fifth link suspension mechanism that couples at least one of the wheels to the vehicle frame, an offset hub motor system that is connected to at least one of the wheels, a lean adjustment system connected to at least one of the wheels, a return to neutral lean position mechanism connected to at least one of the wheels, and a differential system for a leanable vehicle. While the vehicle can seat any suitable number of occupants, in some cases, the vehicle seats one or two occupants. Other implementations are also described.

18 Claims, 29 Drawing Sheets

(52) U.S. Cl.
CPC ......... *B60G 2300/13* (2013.01); *B60G 2300/38* (2013.01); *B60G 2300/45* (2013.01)

(56) References Cited

U.S. PATENT DOCUMENTS

| | | | |
|---|---|---|---|
| 7,731,210 B2* | 6/2010 | Pedersen | 280/124.103 |
| 8,020,878 B2* | 9/2011 | Hara et al. | 280/5.509 |
| 8,240,686 B2* | 8/2012 | Choi | 280/93.51 |
| 8,249,775 B2* | 8/2012 | Van Den Brink | 701/38 |
| 2004/0160030 A1 | 8/2004 | Walters | |
| 2007/0176384 A1* | 8/2007 | Brudeli | 280/124.103 |
| 2008/0001377 A1* | 1/2008 | Rogic | 280/124.125 |
| 2008/0012262 A1* | 1/2008 | Carabelli et al. | 280/124.106 |
| 2009/0299565 A1* | 12/2009 | Hara et al. | 701/29 |
| 2010/0007109 A1 | 1/2010 | Mighell | |
| 2010/0133772 A1* | 6/2010 | Marabese et al. | 280/124.103 |
| 2011/0006498 A1* | 1/2011 | Mercier | 280/124.103 |
| 2011/0266079 A1* | 11/2011 | Boyd et al. | 180/65.51 |

* cited by examiner

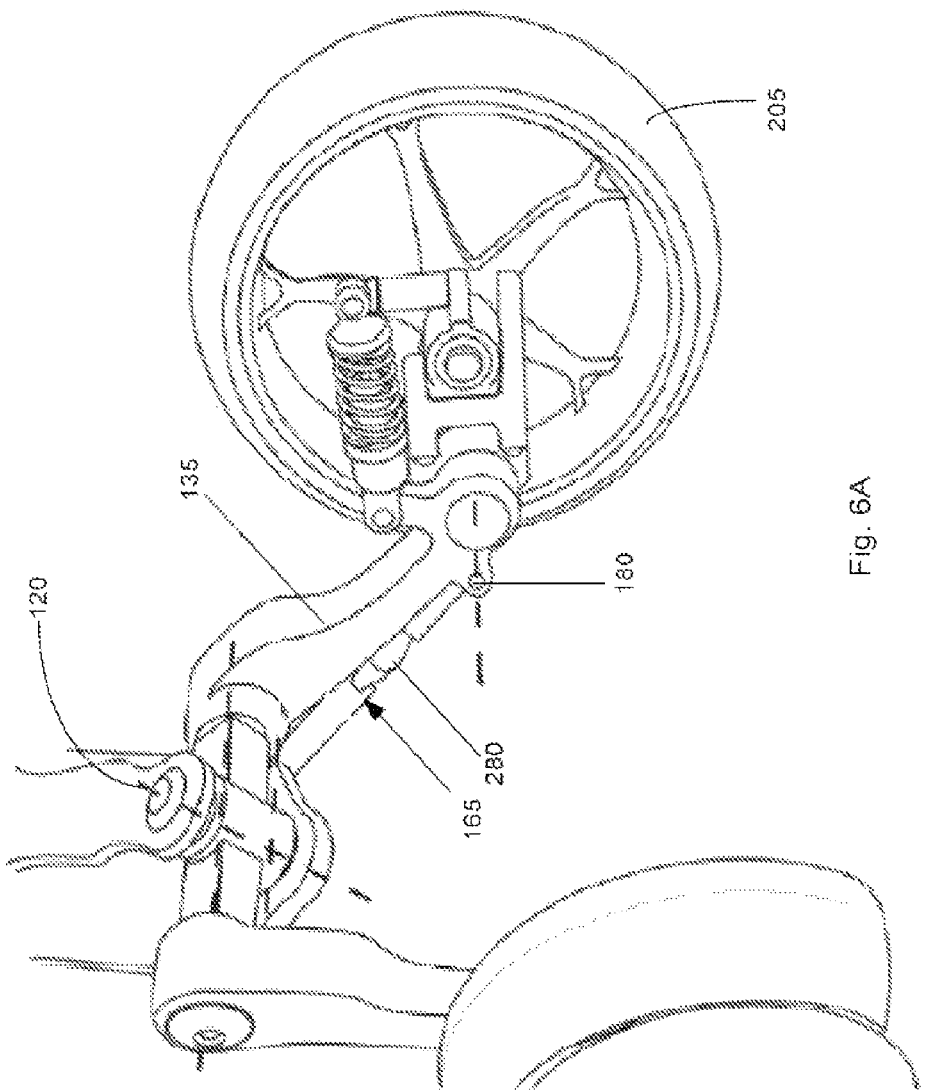

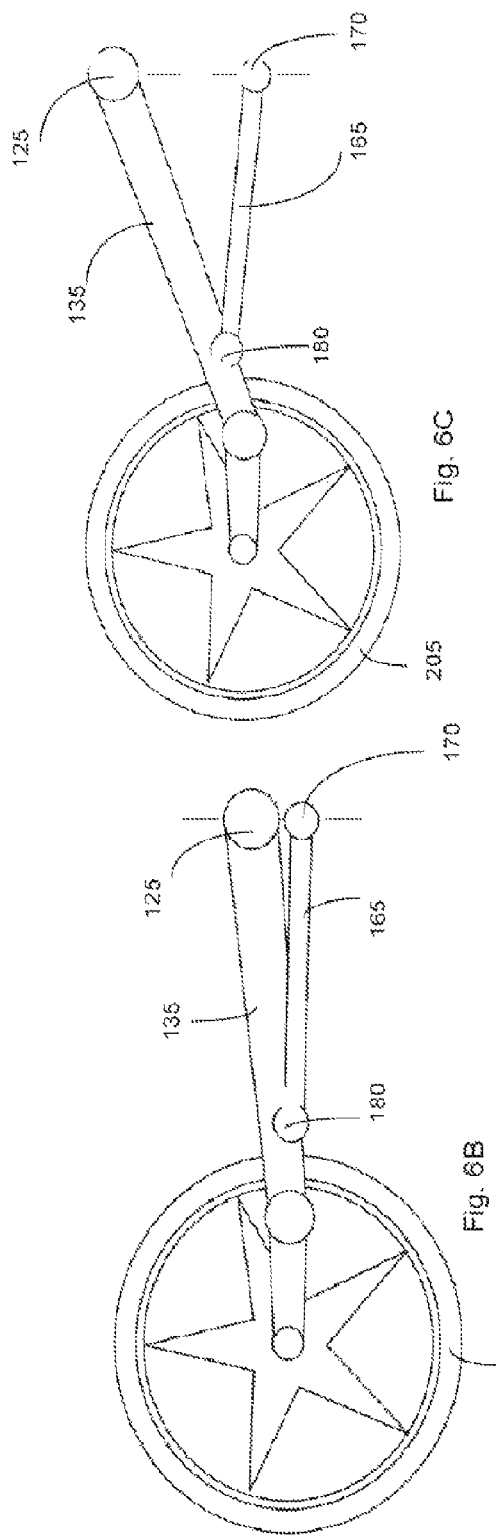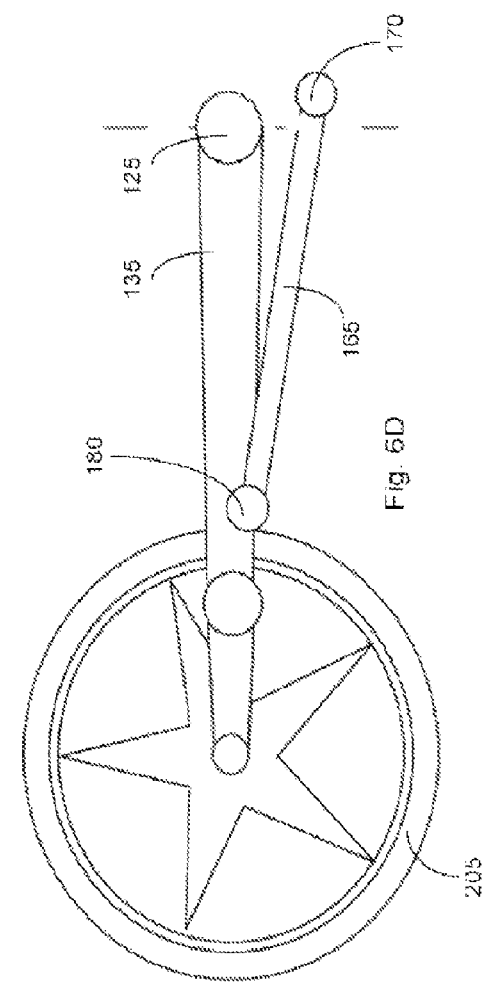

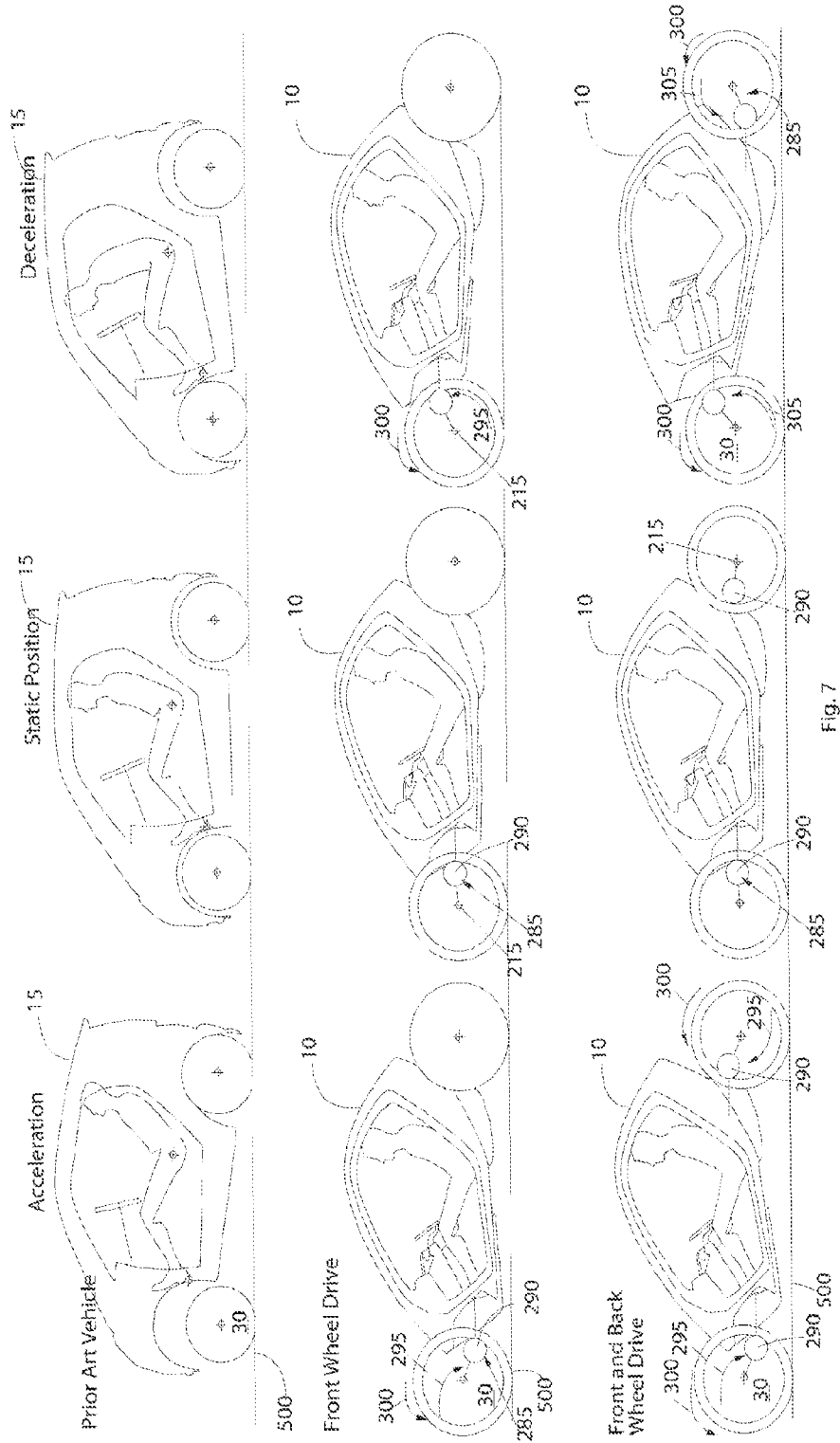

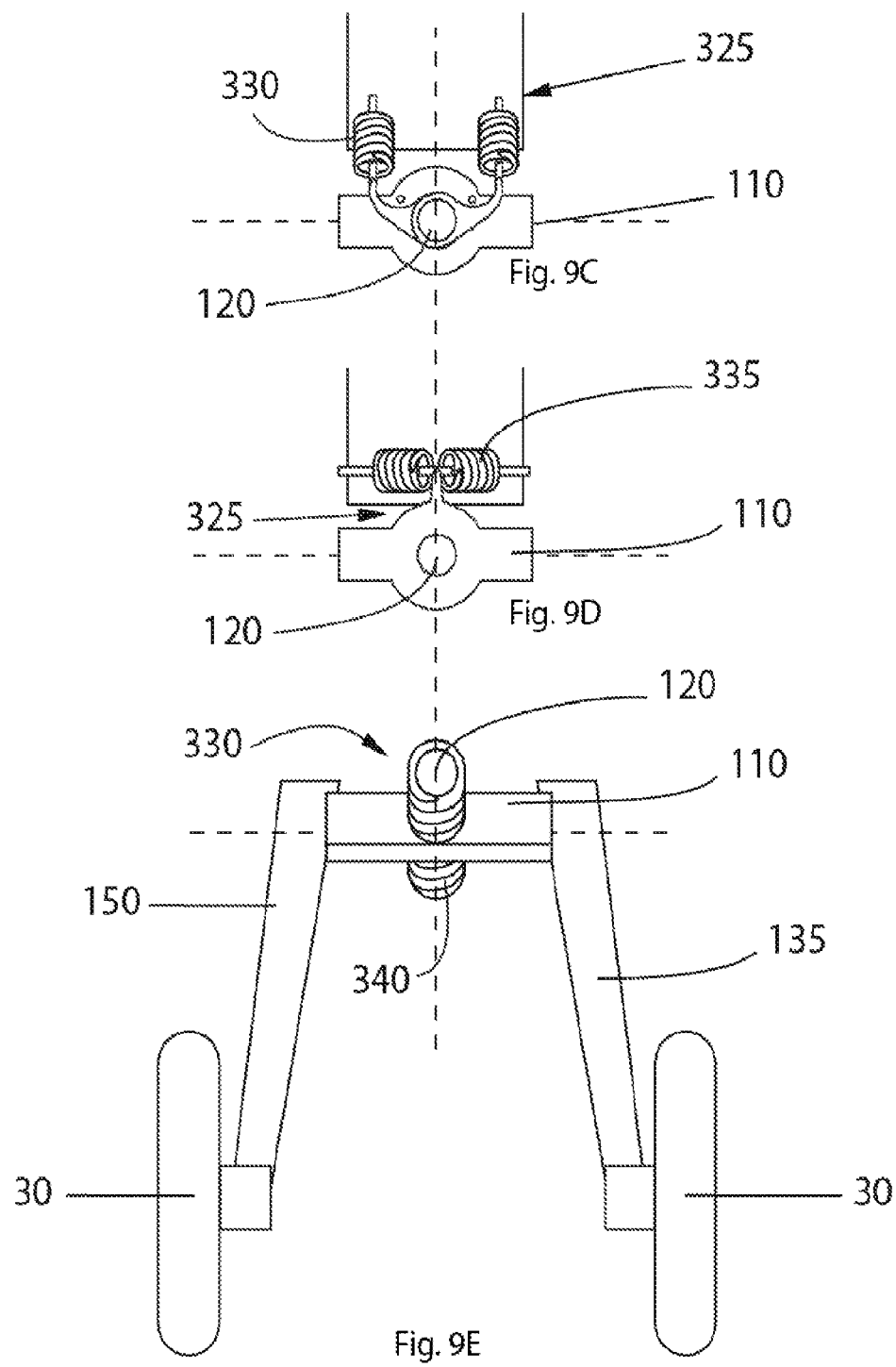

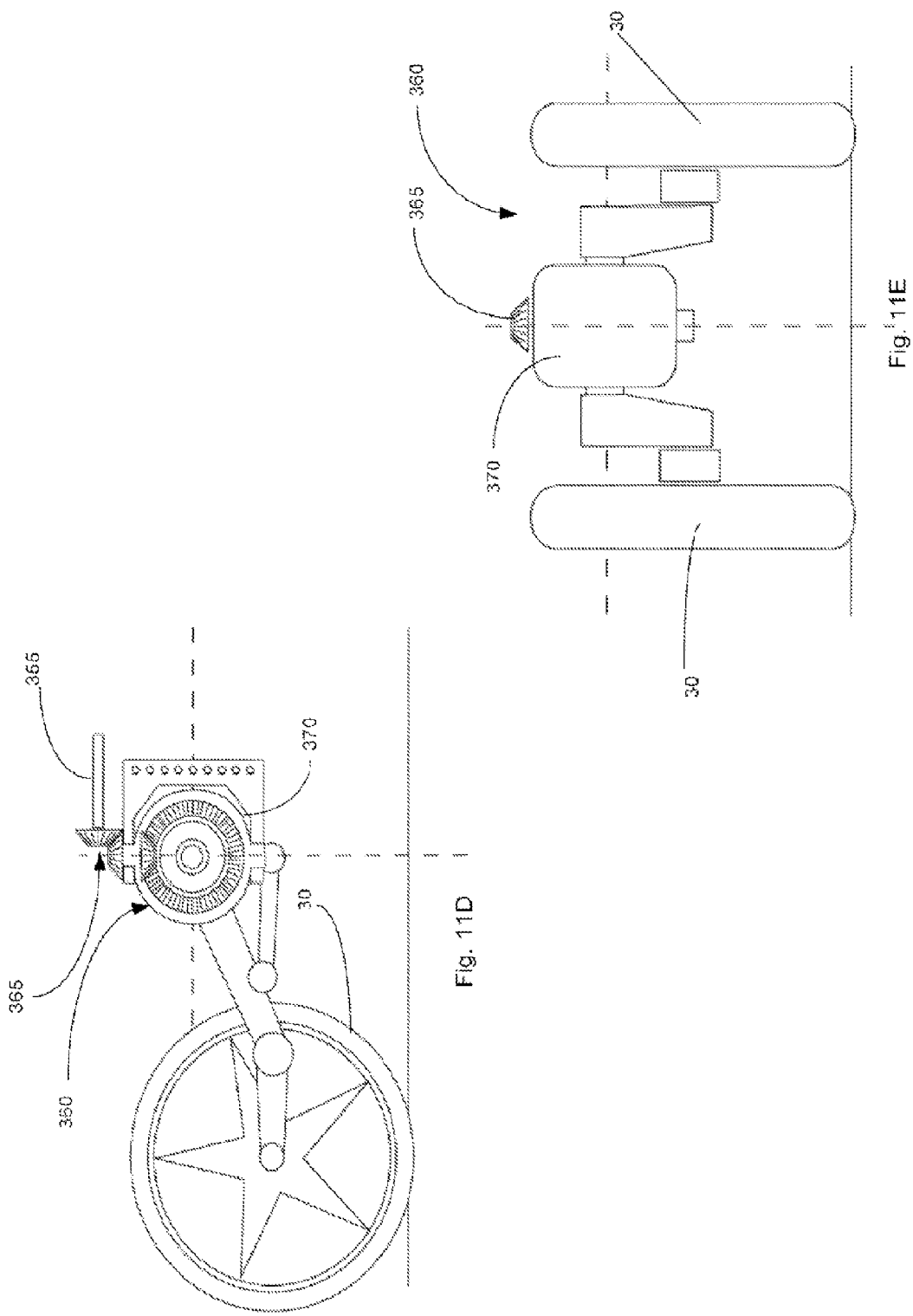

PERSONAL MOBILITY DEVICE

CROSS-REFERENCE TO RELATED APPLICATIONS

This application claims the benefit of U.S. Provisional Application No. 61/379,268, filed Sep. 1, 2010, entitled "Personal Mobility Vehicle," the entire disclosure of which is hereby incorporated by reference.

FIELD OF THE INVENTION

The present invention relates generally to vehicles. More specifically, the present invention relates to vehicles that are leanable, yet stable. The invention further includes such vehicles (including, without limitation, personal mobility vehicles) that are adapted for road use and commuting.

BACKGROUND OF THE INVENTION

Cars today are generally not designed based on the way they are actually used. In this regard, the typical American commuter car is a sedan designed to comfortably seat 4-5 people with a range of about 350 miles or more on a single tank of fuel. That said, these attributes generally do not reflect the daily use of the average commuter vehicle.

According to research done by the United States Department of Transportation in 2008, there are an estimated 900,000,000 car trips made in America each day. Of these daily car trips, about 80% are 10 miles or less, round-trip, and about 50% are made by a single occupant and are less than five miles, round trip. Of commuter trips, about 77% of American commuters drive alone and about 78% of such commuters travel less than 50 miles round trip. Accordingly, the average commuter vehicle uses a relatively large amount of its power to move the weight associated with a car that is capable of carrying 4-5 people, when only one person is in the car. Thus, it will be appreciated that there is a need for a personal mobility vehicle that is designed for the typical daily use of automobiles.

Based upon the foregoing, it would be logical to design cars at the scale of the individual. However, many attempts to develop and market small scale vehicles have been relatively unsuccessful. Two major barriers for these vehicles have been safety and cost. For small vehicles especially, perceived safety is a very influential factor in an initial purchase. Indeed, in many cases, there is an innate feeling of vulnerability in a small vehicle, and all too often this feeling has failed to be dispelled by many of the previous solutions that have been attempted. However, Formula One and other racing franchises have shown that individual safety in a small, lightweight vehicle is very achievable—even without the benefit of active safety mechanisms, like airbags.

Cost is also an inhibiting factor for producing vehicles intended for an individual commuter. Modern manufacturing processes are such that the more units produced, the greater the reduction in the cost of each individual unit. For example, it generally costs less per car to make 10,000 cars than it would to manufacture one. This principle, that it is more economical to produce things on a larger scale, is known as economy of scale. For most of the individual commuter market, economy of scale is never reached. Accordingly, the higher costs that are generally associated with the production of a relatively small number of individual commuter cars make it so that many of these cars do not compare well with other larger cars of a similar price point. Thus, the popularity of many of these individual commuter cars is limited in the market.

In light of the foregoing, it will be appreciated that there is a need in the art for a personal mobility vehicle which is efficient, safe, and affordable.

BRIEF SUMMARY OF THE INVENTION

The present invention provides a personal mobility vehicle. Generally, the vehicle includes a vehicle frame with multiple wheels rotatably connected thereto. The vehicle further includes one or more components that allow the vehicle to be leanable, yet stable. In this regard, such components may include: a fifth link suspension mechanism, an offset hub motor system, a lean adjustment system, a return to neutral lean position mechanism, and a differential system for a leanable vehicle.

The various components of the vehicle can perform any suitable function. In one example, the fifth link suspension mechanism allows at least two wheels that are parallel to each other to lean and turn in harmony. Additionally, because each wheel can each be attached to the vehicle by its own fifth link suspension mechanism, each wheel can have its own independent suspension.

In another example, the offset motor hub system can include a drive surface and a spinning drive member, wherein the drive surface is connected to one or more of the vehicle's wheels and the spinning drive member is both in contact with the drive surface and is pivotally attached to an axle of the wheel though the suspension system that allows the spinning drive member to pivot around the axle. In this manner, the spinning drive member and the suspension can cause a front end of the vehicle to dive upon forward acceleration and to lift upon forward deceleration. Accordingly, some implementations of the offset motor hub system can offset the natural forces that cause some cars' and motorcycles' front ends to lift and to dive, respectively, as they accelerate and decelerate.

In still another example, while some conventional cars that are designed to lean have a lean angle that is mechanically linked to the cars' turn proportion, the described lean adjustment mechanism can allow the described personal mobility vehicle to have a lean angle that is not always fixed to the vehicle's turn angle. Thus, the lean adjustment mechanism can provide the vehicle with the proper leaning angles at both low and high speeds.

In still another example, the return to neutral lean position mechanism aids the vehicle to straighten up out of a lean as the vehicle comes out of a curve.

In yet another example, the differential system for a leanable vehicle allows the differential to rotate from right to left with respect to the vehicle frame as the vehicle turns in such directions. Furthermore, the described differential system can allow a single motor to provide power to wheels that are located near the end of separate elongated swing arms that are individually suspended on the vehicle (e.g., via the fifth link suspension mechanism).

While the described components and mechanisms (e.g., the fifth link suspension mechanism, the offset motor hub system, the lean adjustment system, the return to neutral lean position mechanism, and the differential system for a leanable vehicle) may be particularly useful for personal mobility vehicles, those skilled in the art can appreciate that the various components and mechanisms described herein can be used in a variety of different applications and in a variety of different areas of manufacture to yield leanable vehicles. For instance, while the described components and mechanisms can be used with personal mobility vehicles that seat one or two individuals or that have 3 or 4 wheels, one or more of the described components and mechanisms can also be used on any other suitable vehicle, despite the number of people the vehicle holds and despite the number of wheels that are attached to the vehicle.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

FIG. 1A depicts a front schematic view of a representative embodiment of a personal mobility vehicle, leaning into a turn;

FIGS. 1B-1C each depict front schematic views of a conventional vehicle turning a corner at a relatively high speed;

FIG. 6A depicts a perspective view of a representative embodiment of a portion of the personal mobility vehicle, comprising a lean adjustment mechanism;

FIGS. 6B-6D show side schematic views of some embodiments of the suspension mechanism, modified by a lean adjustment mechanism;

FIG. 7 depicts a lateral transfer of weight in a conventional car and some embodiments of the personal mobility vehicle during acceleration, at rest, and during deceleration;

FIGS. 9B-9E show different views of some embodiments of suitable return to neutral lean position mechanisms;

Figure 12:
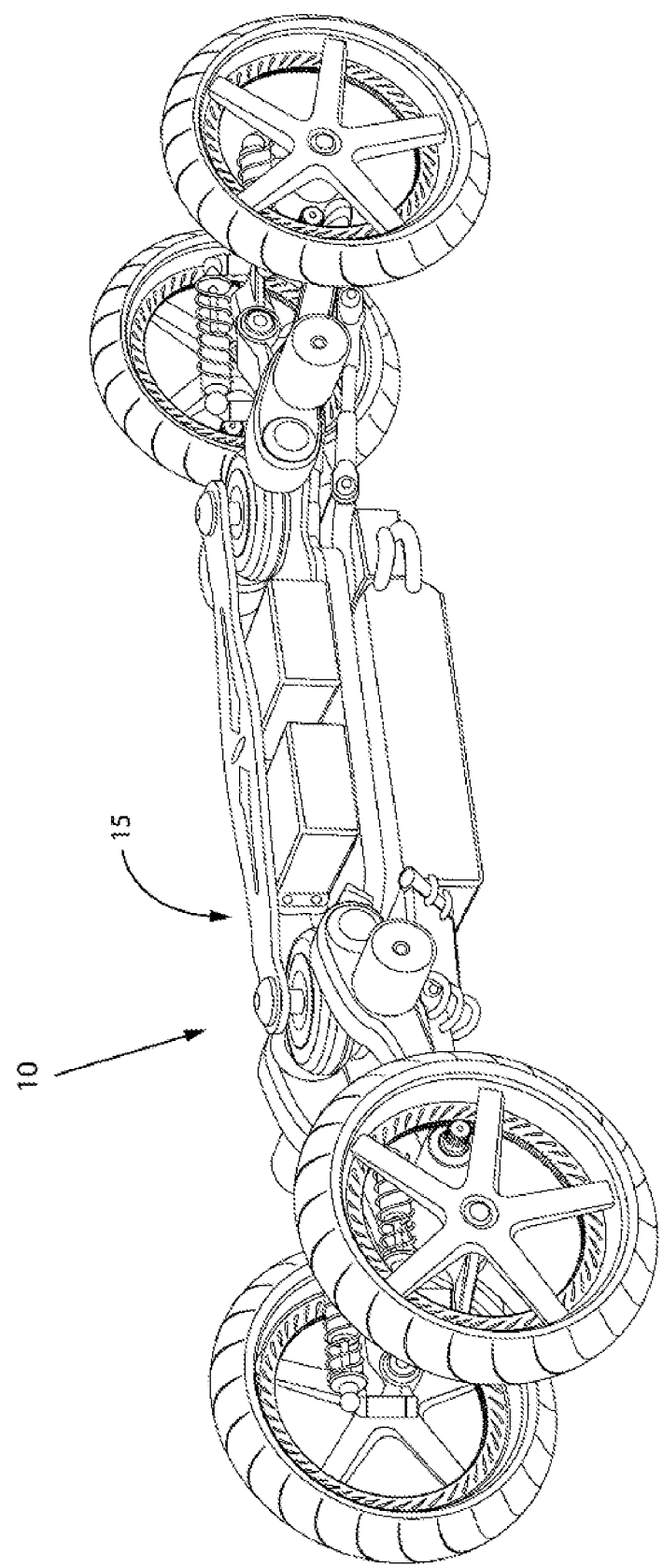
Figure 13:
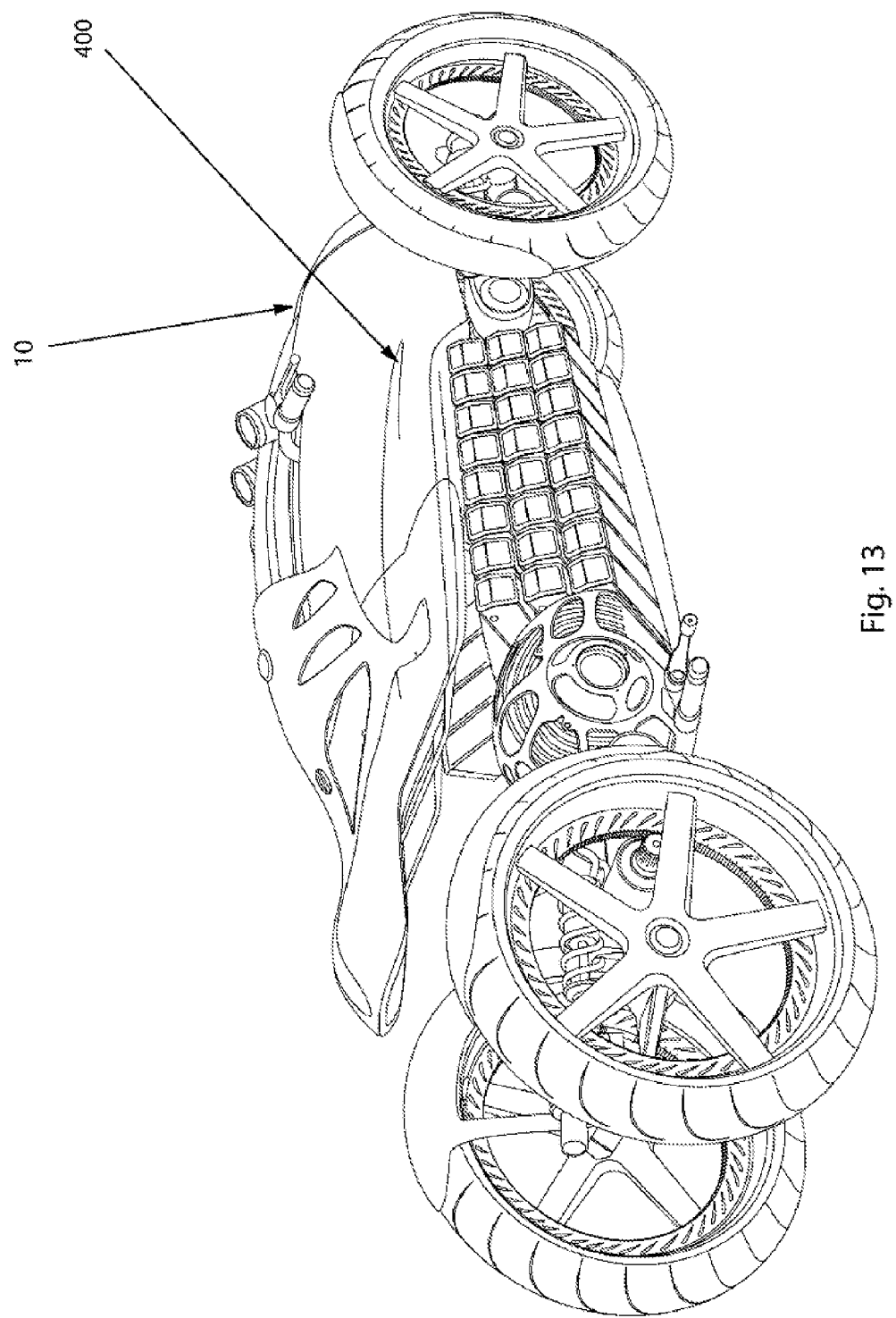
Figure 14:
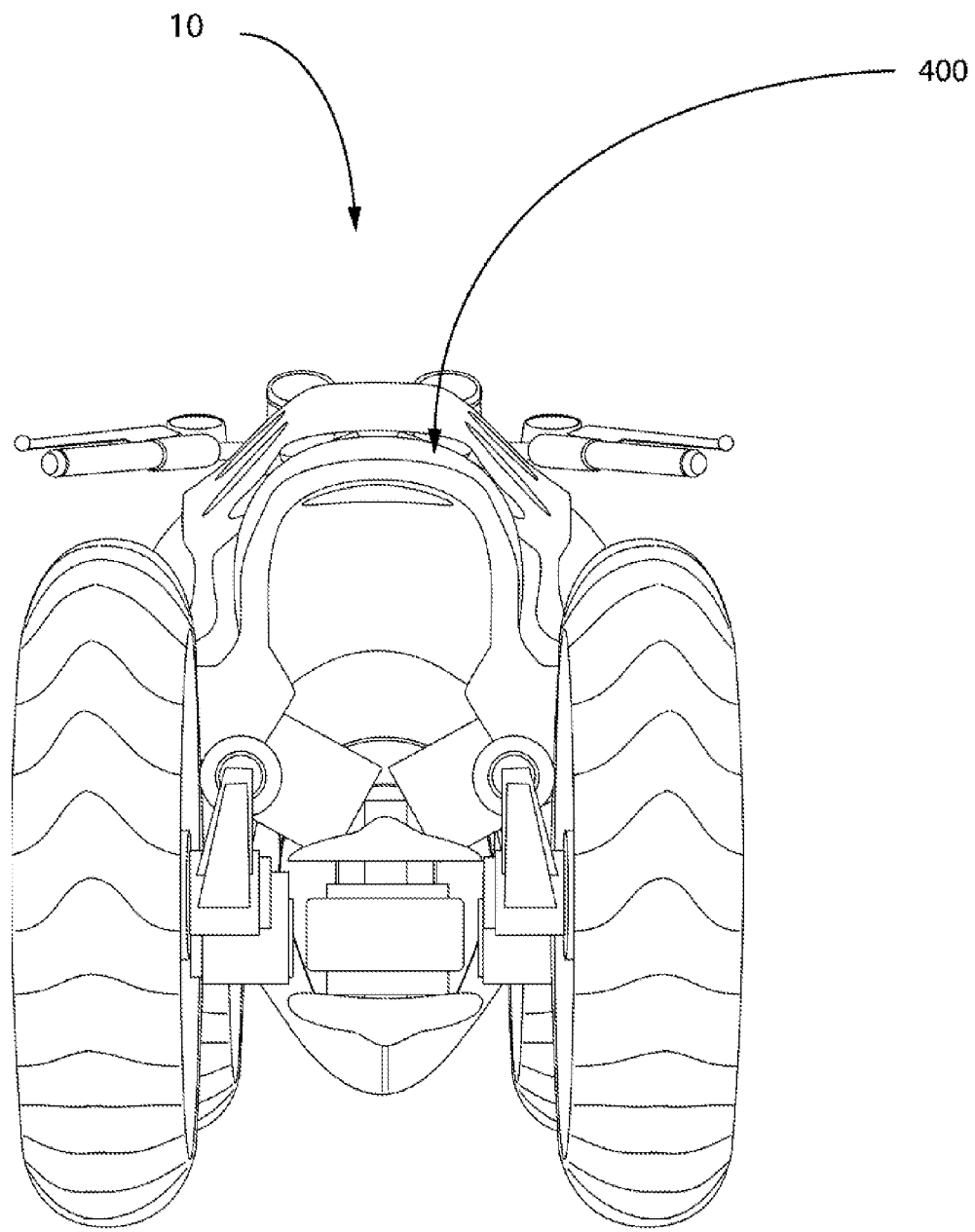
Figure 14:
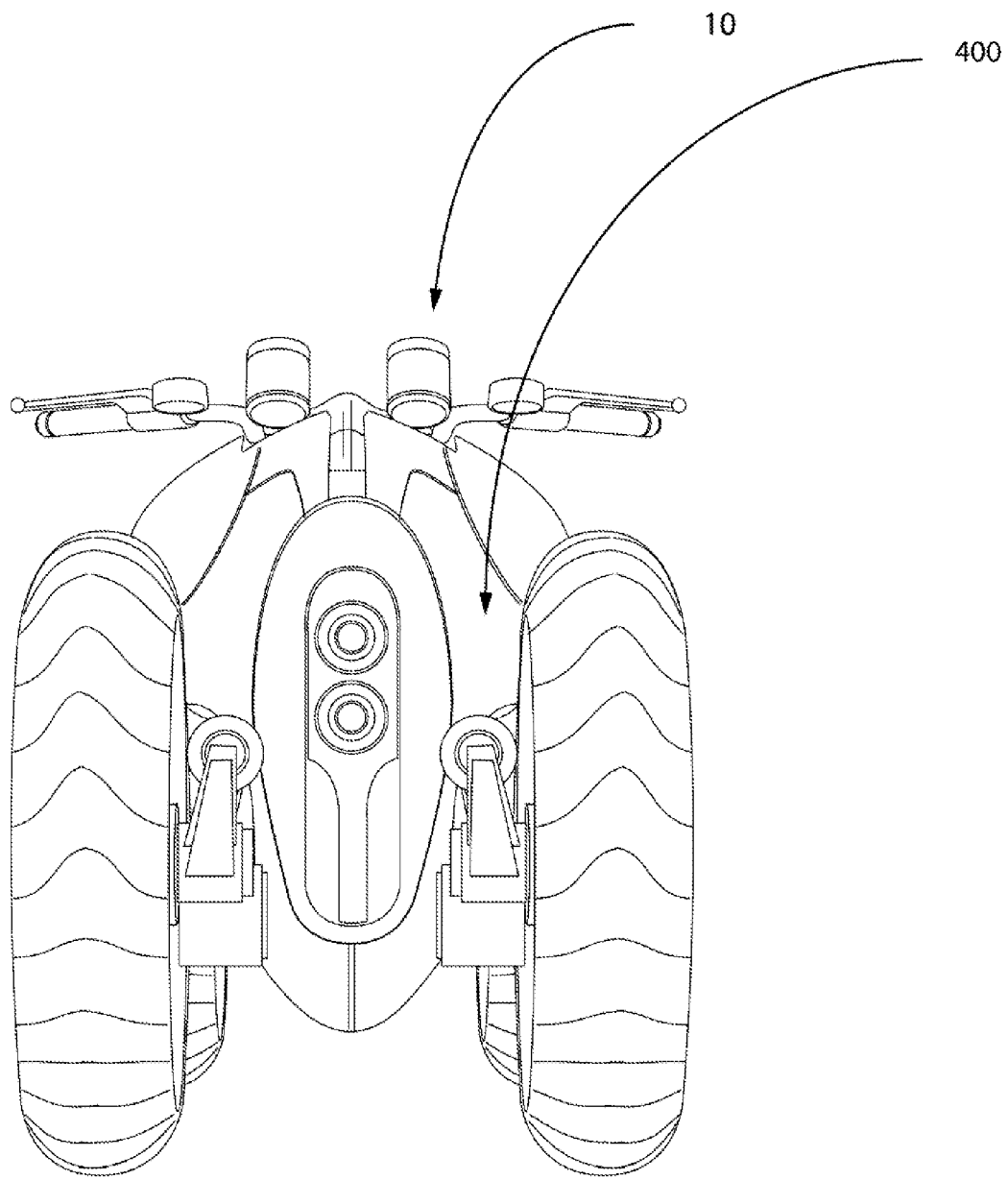

FIGS. 11D-11E respectively depict a side cutaway view and a front schematic view of some embodiments of the personal mobility vehicle comprising the described differential system;

FIG. 12 depicts a perspective view of a representative embodiment of the personal mobility vehicle without a cover; and FIGS. 13-14B depict various views of some embodiments of the personal mobility vehicle.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed, such as characteristics and features of a personal mobility vehicle and several components that can be associated with the vehicle, to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following description of the embodiments of the personal mobility vehicle is not intended to limit the scope of the invention, as claimed, but is merely representative of the embodiments of the invention.

In general, the present invention relates to vehicles that are leanable, yet stable. In some embodiments, such vehicles are personal mobility vehicles, which can be relatively compact, light-weight, and efficient personal transportation vehicles. Because such vehicles can be configured with a vehicle architecture having pairs of leaning wheels, that is 2, 4, or more than 4 leaning wheels, the vehicles can provide both real and perceived stability. In this regard, the personal mobility vehicle can lean to maintain stability in a turn while maintaining the vehicle's wheels in a relatively small track. In addition to providing stability to the vehicle, this leaning feature can also provide an exhilarating sense of movement for the driver. By combining several benefits that are associated with small vehicles, with the stability of a larger car, which benefits can be provided by the vehicle's ability to lean, the described personal mobility vehicle can be a revolutionary innovation.

The described personal mobility vehicle can have any suitable component or characteristic that allows it to function as a leanable vehicle. In one example, the personal mobility vehicle can have any suitable number of wheels and can have any suitable vehicle design that allows the vehicle to be leanable. Indeed, in some embodiments, the vehicle has 3, 4, or more wheels. Furthermore, where the vehicle comprises 3 wheels, the vehicle can have 2 front wheels, 2 back wheels, or any other suitable configuration.

In another example of a suitable characteristic, the personal mobility vehicle may be configured to operate using any suitable drive system. For instance, the vehicle can comprise one or more electric motors and batteries, internal-combustion engines (e.g., a motorcycle-style engine), or a combination of the two.

In some embodiments, however, the personal mobility vehicle is configured as an all-electric commuter vehicle that combines the speed and agility of a motorcycle with the safety and security of a sedan. In some such embodiments, the vehicle is configured as a Plug-in Personal Electric Vehicle (PPEV) or as a light, eco roadster, which is not meant to replace the family car, but is instead meant to replace the car that is used for commuting and urban driving.

Where the described vehicle comprises one or more electric motors, the electric motors can provide the vehicle with several beneficial characteristics. For instance, electric motors can feel much more powerful with less energy than a gas engine, can be more efficient with the power they are given than typical gasoline engines, and can have a substantially flat torque curve.

In embodiments in which the personal vehicle comprises electric motors, the vehicle can have any suitable number of electric motors, in any suitable position. Indeed, in one non-limiting embodiment, the personal mobility vehicle uses two electric motors, one connected to each of the drive wheels (e.g., front wheels and/or back wheels), which may avoid the major power losses of conventional drive train differentials and transmissions. It will be appreciated, however, that the electric motors can be used in any other suitable configuration. For instance, one motor can be used to power more than one wheel.

As another example of a suitable characteristic, the personal mobility vehicle can be designed to hold any suitable number of occupants. In one non-limiting example, the personal mobility vehicle is designed for 1 occupant and some belongings. In another example, the personal mobility vehicle is configured to carry 2 occupants. In still another example, the personal mobility vehicle is configured to carry more than two occupants (e.g., 3, 4, or more). In yet another example, the personal mobility vehicle is sized to carry a passenger as well as 1 to 2 shopping carts of objects, such as groceries.

Figure 1A:
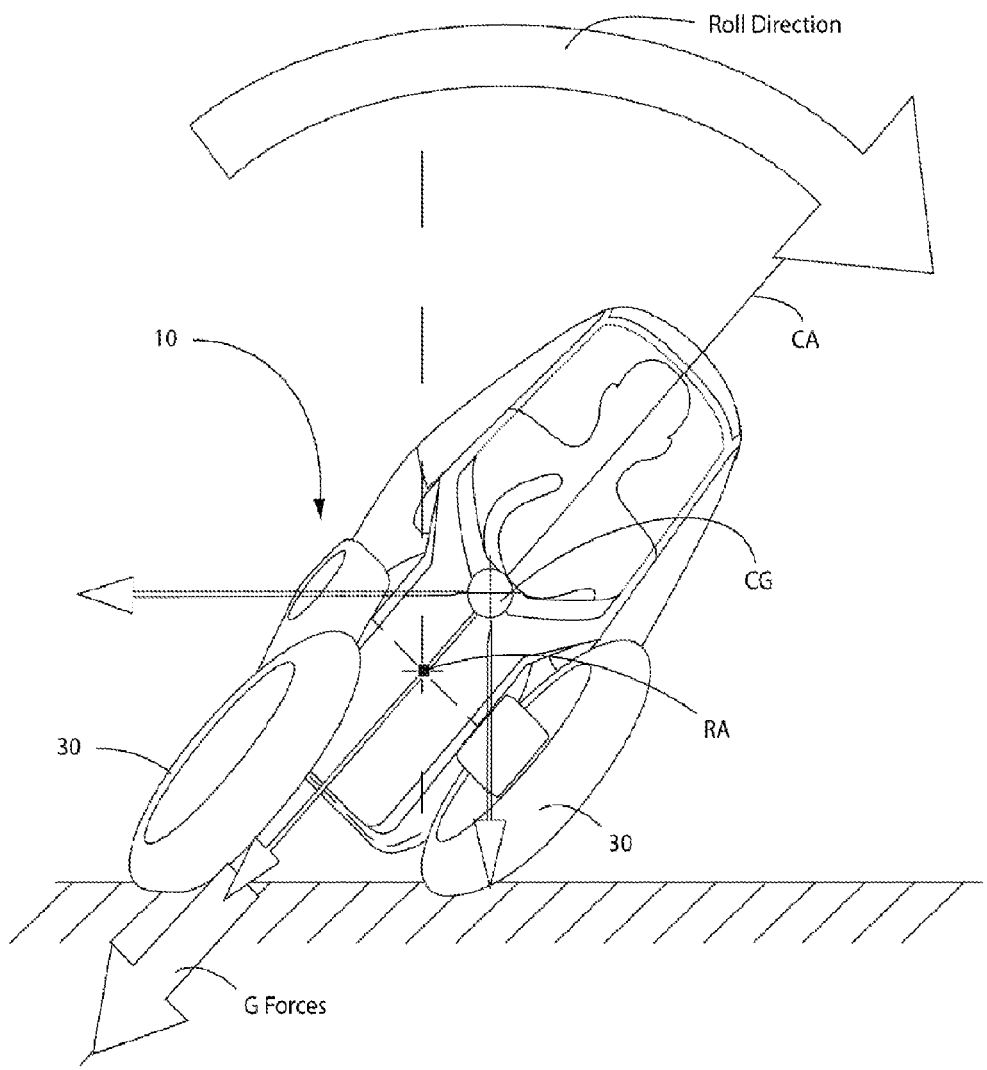
Figure 1B:
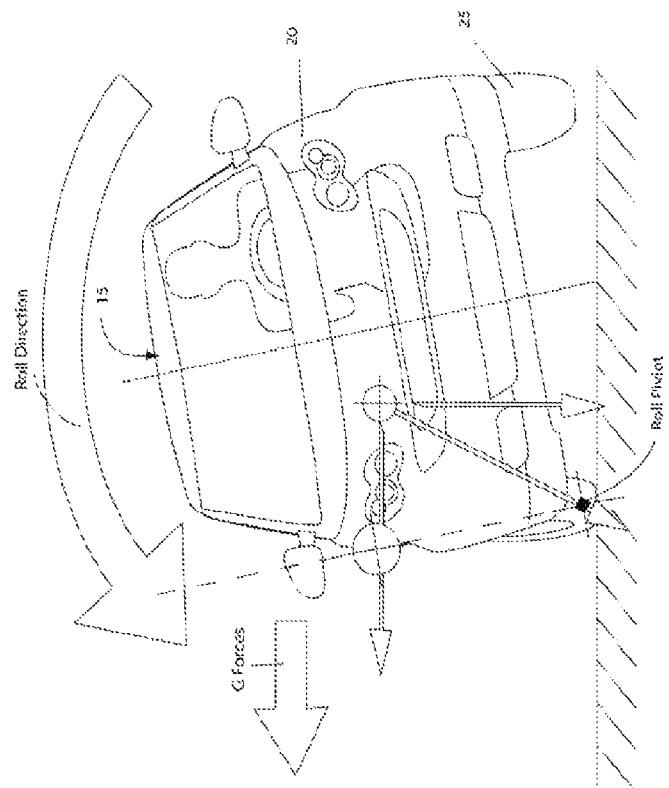
Figure 1C:
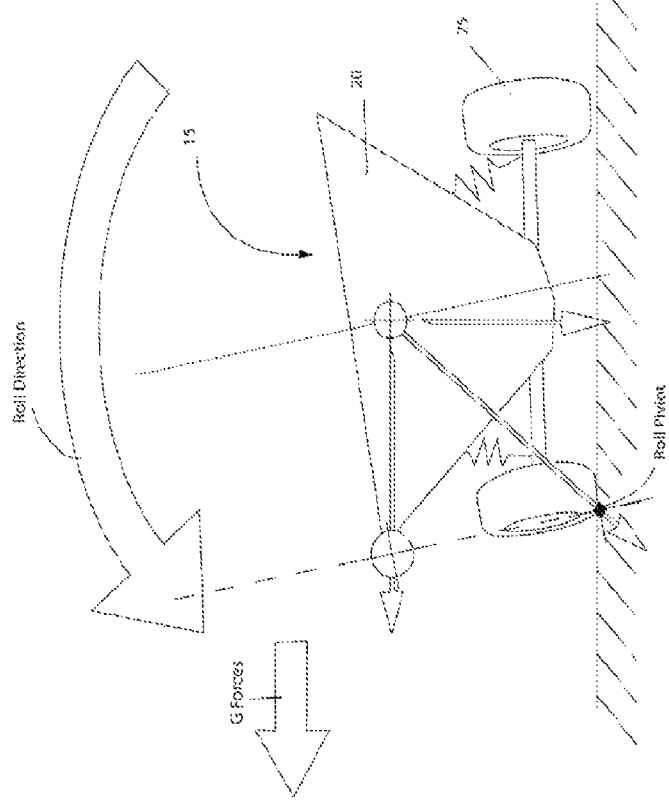

As still another example of a suitable characteristic of the personal mobility vehicle, the vehicle can have its center of gravity in any suitable location that allows the vehicle to be stable as it leans. In some embodiments, however, the vehicle's center of gravity (CG) is disposed at or above the roll axis (RA) of the vehicle 10, as illustrated in FIG. 1A. Additionally, in some embodiments, the vehicle's center of gravity CG and its roll center RA are substantially aligned with each other along a central axis CA of the vehicle 10. As a result, the vehicle can be substantially balanced from side to side. Thus, unlike some conventional vehicles 15 (shown in FIGS. 2B and 2C) in which the vehicles' body 20 acts as a lever against the direction of the turn and can, thereby, lead to rollover, loss of traction to the inside wheel 25, or poor steering, the described personal mobility vehicle can keep its center of gravity CG in line with the angle of the turn to reduce the sensation of G forces on the passenger and to reduce the G forces' effect on the vehicle. Accordingly, unlike some conventional cars, the described vehicle is able to maintain substantially equal pressure on all of its wheels 30 when the vehicle 10 is leaning into a turn as well as when the vehicle is upright.

While the personal mobility vehicle 10 can be any suitable size, in some non-limiting embodiments, the vehicle is about half the width of the average sedan. In one example, the vehicle's width is less than an amount selected from about 48 inches, about 40 inches, and about 38 inches (e.g., about 35 inches±5 inches). Similarly, while the vehicle can be any suitable length that allows it to function as described herein, in some non-limiting embodiments, the vehicle's length is less than an amount selected from about 144 inches, about 110 inches, and about 100 inches (e.g., about 96 inches±5 inches). Moreover, while the personal mobility vehicle can be any suitable height, in some embodiments, the vehicle's height is less than an amount selected from about 80 inches, about 70 inches, and about 65 inches (e.g., about 60 inches±about 5 inches).

Figure 2:
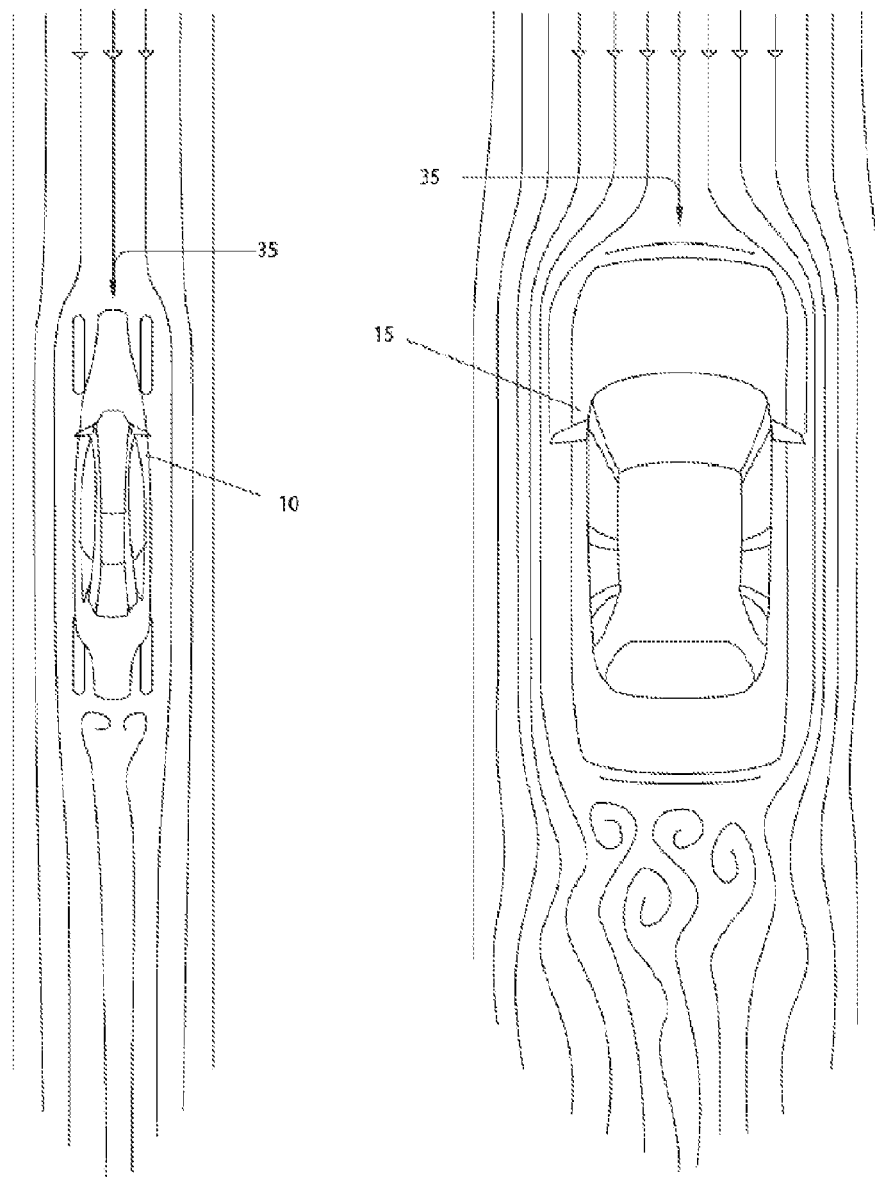
FIG. 2 depicts top view showing potential differences in drag coefficients associated with a representative embodiment of the personal mobility vehicle and a prior art sedan.

Because some embodiments of the personal mobility vehicle 10 are substantially smaller than the average sedan 15, such embodiments may have several beneficial characteristics—several non-limiting examples of which are discussed below under separate subheadings:

Reduced Wind Resistance. The size of the frontal area of a car is often a key factor determining how much air the car has to push. In this regard, at 60 mph and above, about 80% of an average passenger car's energy is spent just pushing air out of the car's way. That said, FIG. 2 shows that where the frontal area 35 of the personal mobility vehicle 10 is substantially less than that of a typical four-door sedan 15, the personal mobility vehicle 10 can have a smaller drag coefficient than the average sedan—meaning that the personal mobility vehicle spends less energy pushing air out of its way than does the average sedan.

Figure 3A:
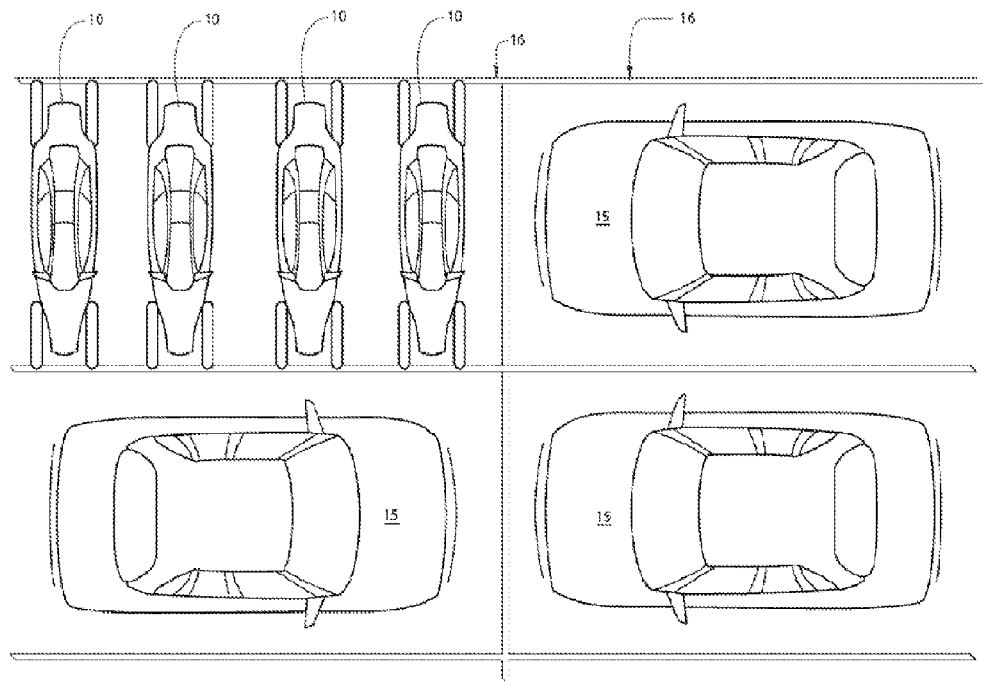
FIG. 3A depicts a top schematic view of some embodiments of the personal mobility vehicle in a parking spot.

Parking. Because some embodiments of the personal mobility vehicle 10 are relatively small, such embodiments can make parking the vehicle easier. Indeed, in one example, the personal mobility vehicle can park perpendicular to a curb, in left-over spaces between cars or driveways, next to buildings, in unused corners of parking lots, or in a variety of other spots that are unusable by the typical sedan 15. In another example, FIG. 3A shows that 4 personal mobility vehicles 10 can be parked abreast in the average sized parking space 16 (e.g., a nine-foot by thirteen-foot parking space) with room for egress. Accordingly, the personal mobility vehicle can help open massive increases in the number of commuters that could be provided space for parking in a given lot. This is revolutionary to urban areas where parking is at a premium.

Figure 3B:
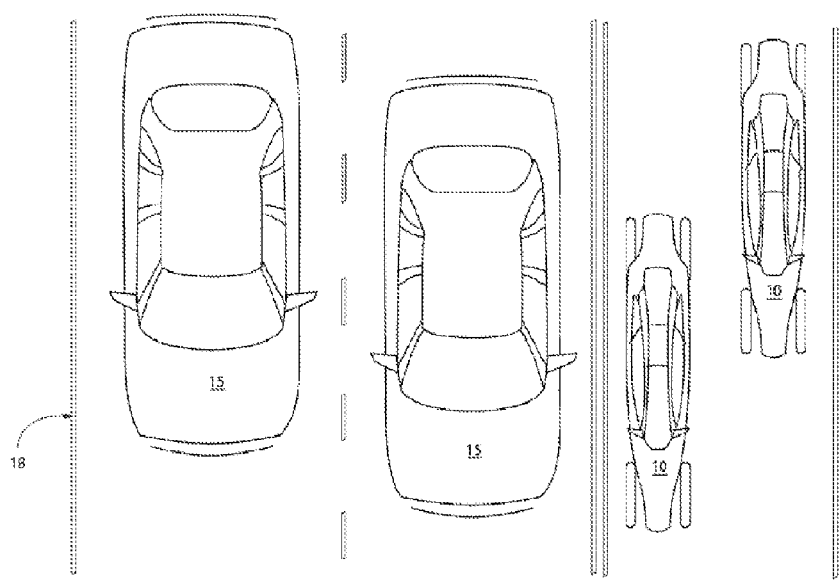
FIG. 3B depicts a top schematic view of some embodiments of the personal mobility vehicle in a traffic lane.

Lane Splitting. In locations (such as California, Europe, and Asia) where lane splitting is permitted, the personal mobility vehicle 10 can greatly reduce traffic congestion. An example of lane splitting is shown in FIG. 3B. Specifically, FIG. 3B shows that some embodiments of the personal mobility vehicle 10 can fit in a 6-foot half-lane with more side to side clearance than a typical sedan 15 has in a full 12-foot freeway lane 18. This virtual doubling of lane capacity could be beneficial to cities and states seeking to alleviate congestion on streets and interstates.

Slow Traffic. The characteristics of some embodiments of the personal mobility vehicle 10 allow it to maneuver through traffic car. That said, some embodiments of the personal mobility vehicle are capable of changing lanes, accelerating, and maneuvering through slow traffic like a motorcycle. Unlike a motorcycle, however, some embodiments of the vehicle can include a cabin that is safe, dry, and climate controlled.

Rolling Resistance. Tire width and vehicle weight generally act against cars as they move down the road. By reducing both of these, some embodiments of the personal mobility vehicle 10 are extremely energy efficient.

Light Weight. Because some embodiments of the personal mobility vehicle 10 are relatively light weight, such embodiments can have a relatively quick acceleration time, short braking distance, high maneuverability, high fuel economy, and can be relatively safe.

As discussed earlier, safety is a major concern for many small cars, particularly when such cars share highways with large trucks and semis. Accordingly, the personal mobility vehicle 10 can be designed to include any suitable safety features that can make it a very safe vehicle. In this regard, some embodiments of the personal mobility vehicle have relatively good visibility for their drivers, a low center of gravity, and increased maneuverability that allow the vehicle to be well equipped to avoid potential accidents.

Figure 4:
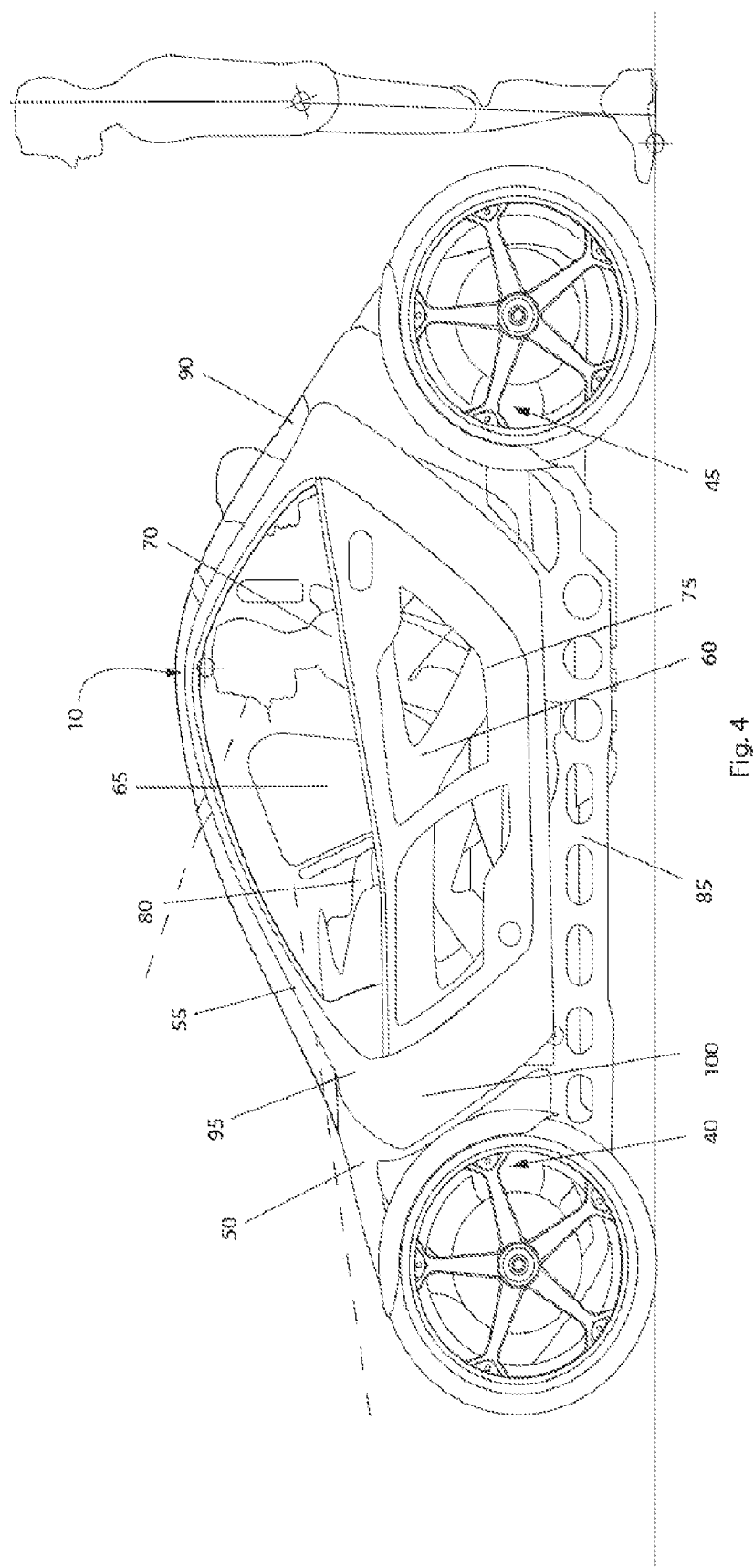
FIG. 4 depicts a side schematic view of a representative embodiment of the personal mobility vehicle, showing some potential safety features.

In anticipation of the inevitable event of an impact, however, the personal mobility vehicle 10 may have any suitable safety feature, including, without limitation, one or more safety features that are specifically designed to benefit from the lower mass of the vehicle. By way of non-limiting illustration, FIG. 4 shows that some examples of such safety features include, but are not limited to: traction control 40; ABS braking 45; front and rear crumple zones 50; a composite/alloy driver cell 55; side impact supports 60; driver and side airbags 65; a 5-point seat belt 70; a safety seat 75; a collapsible steering column 80; an isolated battery compartment 85; polycarbonate windows 90; collision anticipation electronics 95; and a network to emergency response 100.

While the various safety features can provide the personal mobility vehicle 10 with any suitable characteristic, in some embodiments, the vehicle's frame comprises one or more different alloys and/or composites that provide specialized characteristics to each area of the frame for maximum strength. Furthermore, the personal mobility vehicle's small frame size can make it more rigid and stronger than the average car frame having a similar construction. Additionally, while the composite drive safety cell 55 can provide the vehicle with any suitable characteristic, in some embodiments, the cell integrates multiple nesting shells (like a motorcycle helmet). These alternating shells and cushion zones can then flex or crush at different speeds and thereby dissipate momentum and reduce internal injuries to a passenger.

In additional to safety concerns from an impact (e.g., a crash), rollover is also a great danger for many vehicles, and an extreme danger to narrow vehicles. In order to mitigate and otherwise reduce this danger, the personal mobility vehicle 10 can have one or more components and mechanisms that allow the vehicle to lean or otherwise be stable as it turns. Some non-limiting examples of such mechanisms include a fifth link suspension mechanism, a lean adjustment system, an offset motor hub system, a return to neutral lean position mechanism, and a differential system for a leaning vehicle—each of which are discussed below in more detail.

Fifth Link Suspension.

While some cars have a conventional four bar linkage that connects the car's wheels to the car's body and allows the wheels to lean and turn, many such linkages do not have a suspension mechanism that allows the car's wheels to individually follow the topography of the road, without interfering with the car's lean characteristics. In this regard, many conventional four bar linkages utilize vertical suspension systems that result in high unsprung weight on the system, or more accurately, a high unsprung mass. This high unsprung mass, in turn, can limit the ability of the wheels that are connected to such conventional linkages to follow bumps and road topography.

Unlike some cars with a conventional four bar linkage suspension system, some embodiments of the personal mobility vehicle 10 comprise one or more suspension mechanisms that hold at least two wheels in parallel with each other, allow the two wheels to lean and turn in harmony with each other, and allow the wheels to be suspended independently. While the personal mobility vehicle can comprise any suitable suspension mechanism that allows the wheels to move in the aforementioned manner, in some embodiments, the vehicle comprises one or more fifth link suspension mechanisms. In such embodiments, the fifth link suspension system can perform any suitable function, including reducing bump-steer problems and reducing the overall unsprung weight. Indeed, in some embodiments, the described fifth link suspension provides a horizontal suspension system that adds one more degree of freedom to wheel movement (over the conventional four bar linkage) so that each wheel can move independently over road bumps.

While the fifth link suspension mechanism can comprise any suitable component, in some embodiments, the mechanism comprises a horizontal member, a swing arm, a support arm, a suspension arm, and/or a fifth linkage. Furthermore, while the fifth link suspension mechanism can comprise any suitable combination of the aforementioned components, in any suitable configuration, FIGS. 5A-5E illustrate some non-limiting embodiments of the fifth link suspension mechanism.

Figure 5A:
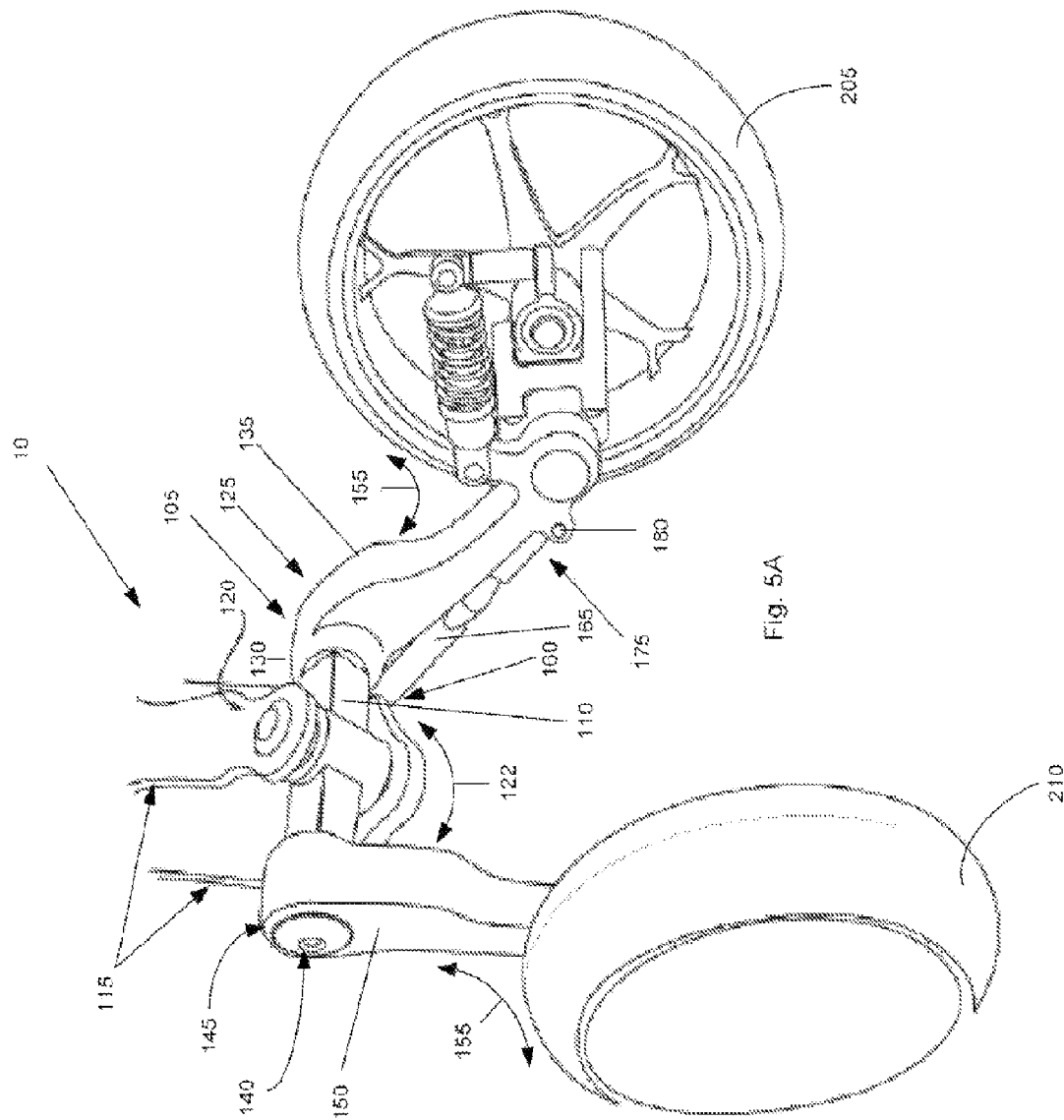
FIG. 5A depicts a perspective view of a portion of a representative embodiment of the personal mobility vehicle, comprising a fifth link suspension mechanism.

Specifically, FIG. 5A shows some embodiments in which the fifth link suspension mechanism 105 comprises a horizontal member 110 that is rotatably attached to a frame 115 of the personal mobility vehicle 10. In this regard, FIG. 5A shows the horizontal member 110 is attached to the frame 115 about a root axis 120 that allows the horizontal member to rotate from one side to another (e.g., right to left and vice versa) in a first plane of motion (as illustrated by arrow 122). Accordingly, the horizontal member can be used to help steer the vehicle from left to right and vice versa. With reference to this horizontal member, it should be noted that because the personal mobility vehicle is capable of leaning, the term "horizontal" may be used herein to refer to the horizontal member's orientation with respect to the vehicle frame 115, and not with respect to the ground on which the vehicle 10 sits.

While the horizontal member 110 can perform any suitable function, FIG. 5A shows that, in some embodiments, the horizontal member 110 is pivotally connected to a first pivot joint 125 near a first end 130 of a first swing arm 135 as well as to a first pivot joint 140 near a first end 145 of a second swing arm 150 in a manner that allows the swing arms to independently pivot back and forth on the horizontal member 110 in a second plane of motion (as illustrated by arrows 155).

FIG. 5A further shows that, in some embodiments, a first end 160 of a first support arm 165 is pivotally connected to the vehicle frame 115 (e.g., via a first pivot joint 170 (not shown in FIG. 5A), such as a ball joint, a rod-end bearing, a Heim joint, or another joint that allows the support arm 165 to pivot and lean with respect to the frame 115). Furthermore, FIG. 5A shows that a second end 175 of the first support arm 165 is pivotally connected to the first swing arm 135 (e.g., via a second pivot joint 180 near the first support arm's second end 175 of the first support arm 165). While not shown in FIG. 5A, a second support arm 185 having a first pivot joint 190 near its first end 194, and a second pivot joint 195 near its second end 200, can be connected between the second swing arm 150 and the vehicle frame 115 in a similar fashion. Thus, when the horizontal member rotates from side to side the distance between the first pivot joint (e.g., 125 and 140) of the swing arms (e.g., 135 and 150) and the corresponding first pivot joints (e.g., 170 and 190) of the support arms (e.g., 165 and 185) can be changed to force the wheels 205 and 210 to turn and raise and/or lower so as to cause the wheels to lean. In some embodiments, this connection between the first pivot joint (e.g., 125 and 140) of the swing arms (e.g., 135 and 150), through the root axis 120, and to the corresponding first pivot joints (e.g., 170 and 190) of the support arms (e.g., 165 and 185) is one of the linkages in the fifth link mechanism (e.g., a virtual linkage).

To illustrate how the fifth link suspension mechanism 105 can be configured, FIGS. 5B through 5E show various embodiments of the suspension mechanism without the horizontal member 110 and vehicle frame 115. For the sake of simplicity, the following discussion refers to the various components in general, and not with respect to being a first, second, or other ordinal component (e.g., a first swing arm) of the suspension mechanism. In this regard, while the following discussion may use reference numbers from a first fifth link suspension mechanism, the skilled artisan will recognize that similar suspension mechanisms and configurations can be used as desired for any additional number of wheels.

Figure 5B:
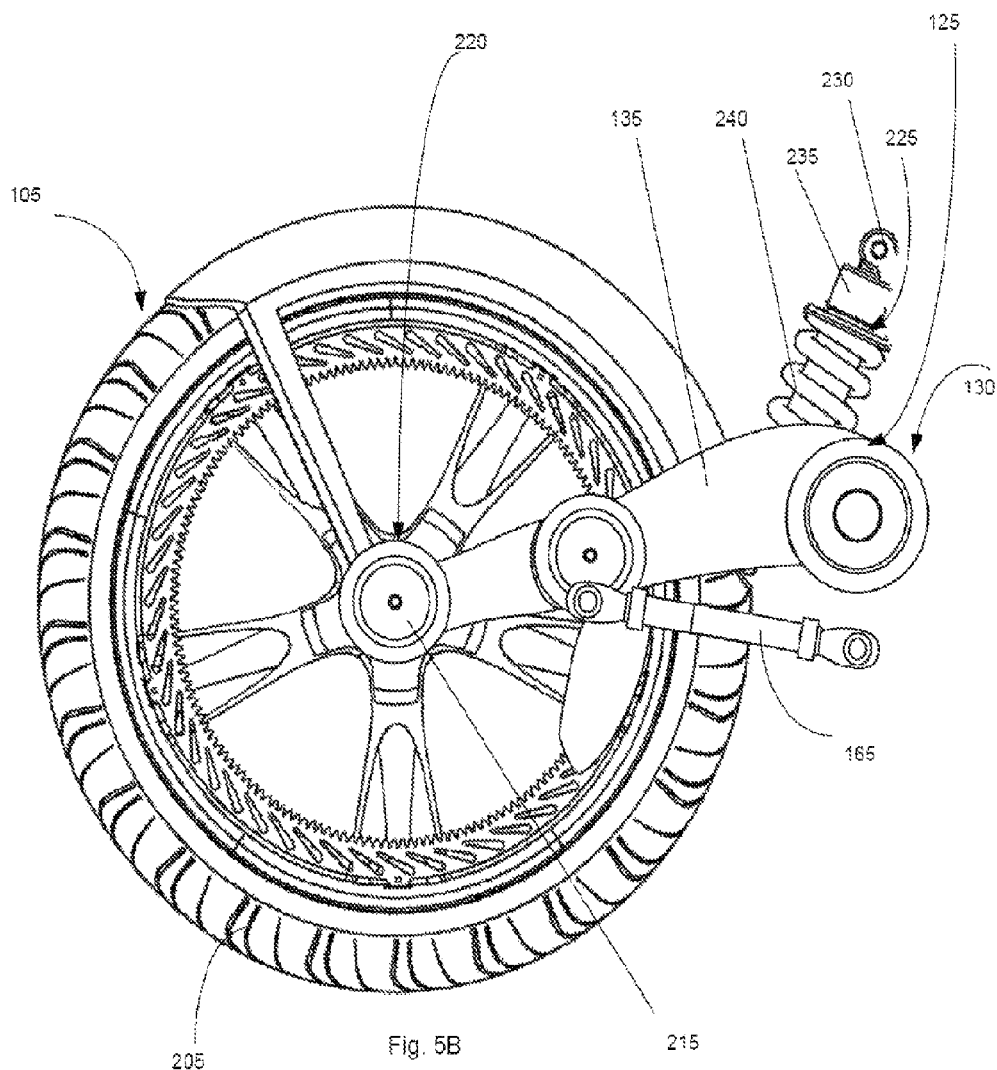
FIGS. 5B-5E depict side schematic views of some embodiments of a portion of the fifth link suspension mechanism.

FIG. 5B shows a representative embodiment in which the suspension mechanism 105 comprises the first swing arm 135 having its first pivot joint 125 near the swing arm's first end 130 and a first wheel 205 rotatably connected via an axle 215, near the swing arm's second end 220. In this regard, FIG. 5B shows an embodiment in which the swing arm 135 only comprises a first pivot joint 125 and does not include a second pivot joint between the first pivot joint and the wheel's axle 215. Additionally, while FIG. 5B shows that the support arm 165 can extend from the first swing arm 135 to the vehicle frame 115 (not shown in FIG. 5B), that Figure also shows that an extendable fifth linkage 225 can be pivotally attached to the swing arm 135, between the swing arm's first 130 and second 220 ends. In turn, a second end 230 of the fifth linkage 225 can be attached to the vehicle frame 115 (not shown) at any suitable location that provides the wheel 205 with its own independent suspension.

The fifth linkage 225 can comprise any suitable biasing member that allows the wheel 205 to which it is attached (e.g., via the swing arm 135) to have its own independent suspension. In this regard, some non-limiting examples of suitable components for the fifth linkage include one or more shocks, springs, or combinations thereof. By way of non-limiting example, FIG. 5B shows an embodiment in which the fifth linkage 225 comprises a shock 235 and a shock dampener 240.

Figure 5C:
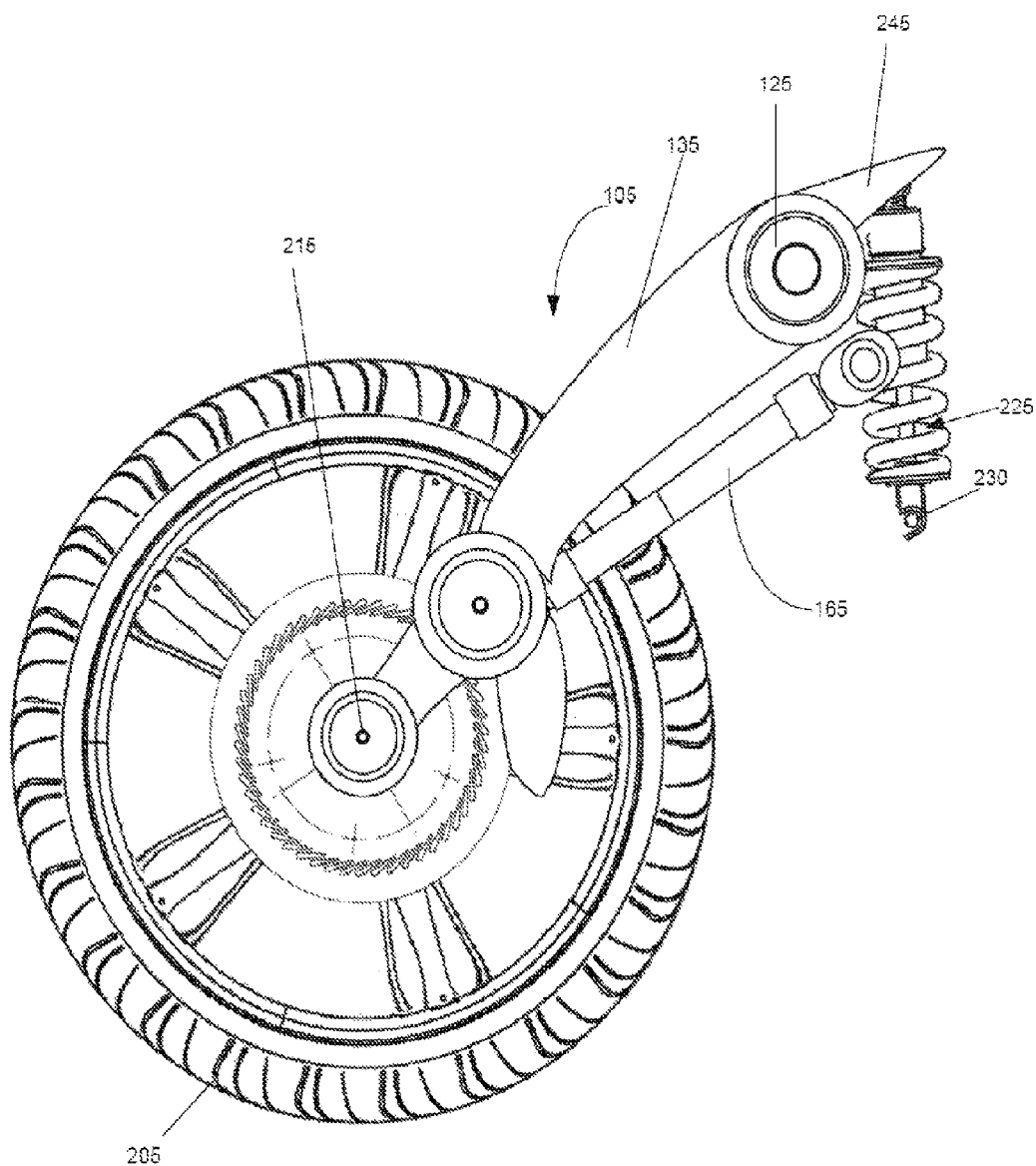

As another example of a suitable configuration for the fifth link suspension 105, FIG. 5C shows an embodiment in which the fifth linkage 225 is pivotally attached to lever arm 245 that extends past the first pivot joint 125 on the swing arm 135. In turn, the fifth linkage's second end 230 can be attached to any suitable portion of the vehicle frame 115 (not shown) in order to provide the first wheel 205 with its own independent suspension.

Figure 5D:
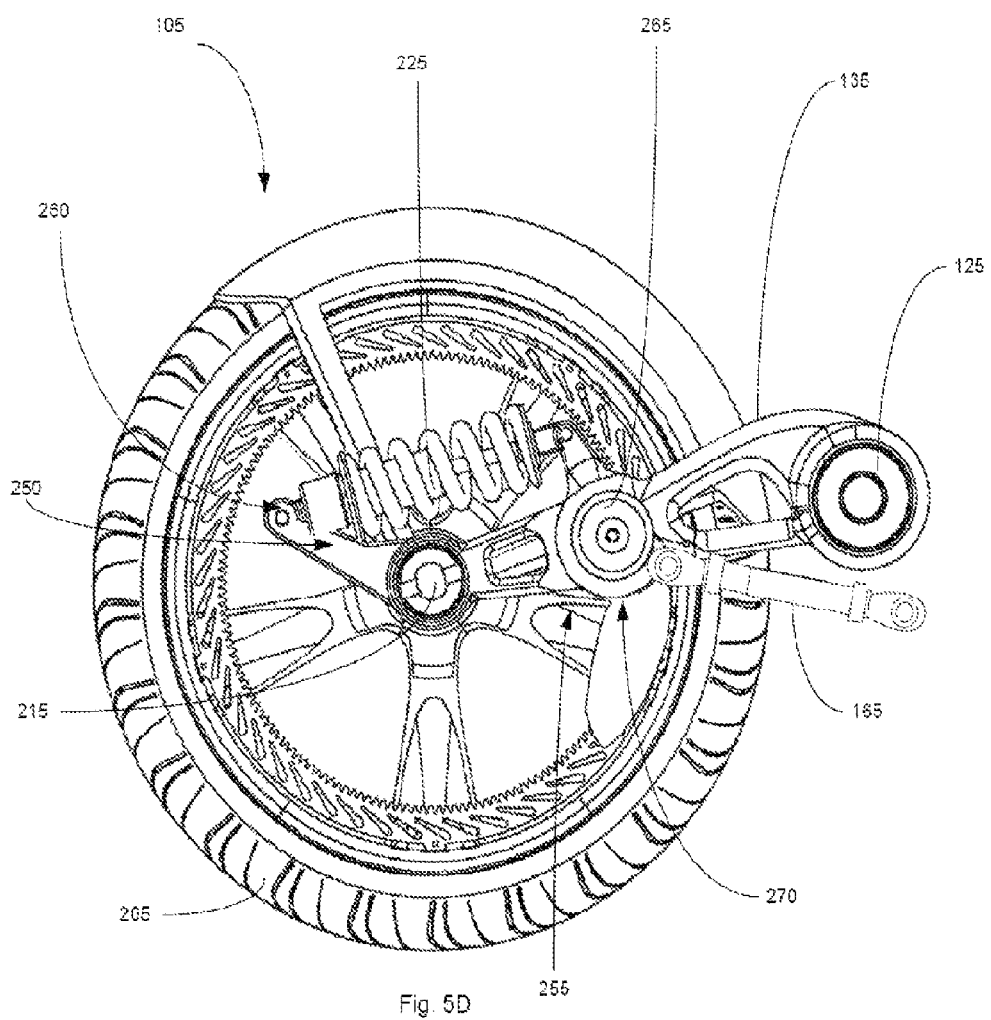
Figure 5E:
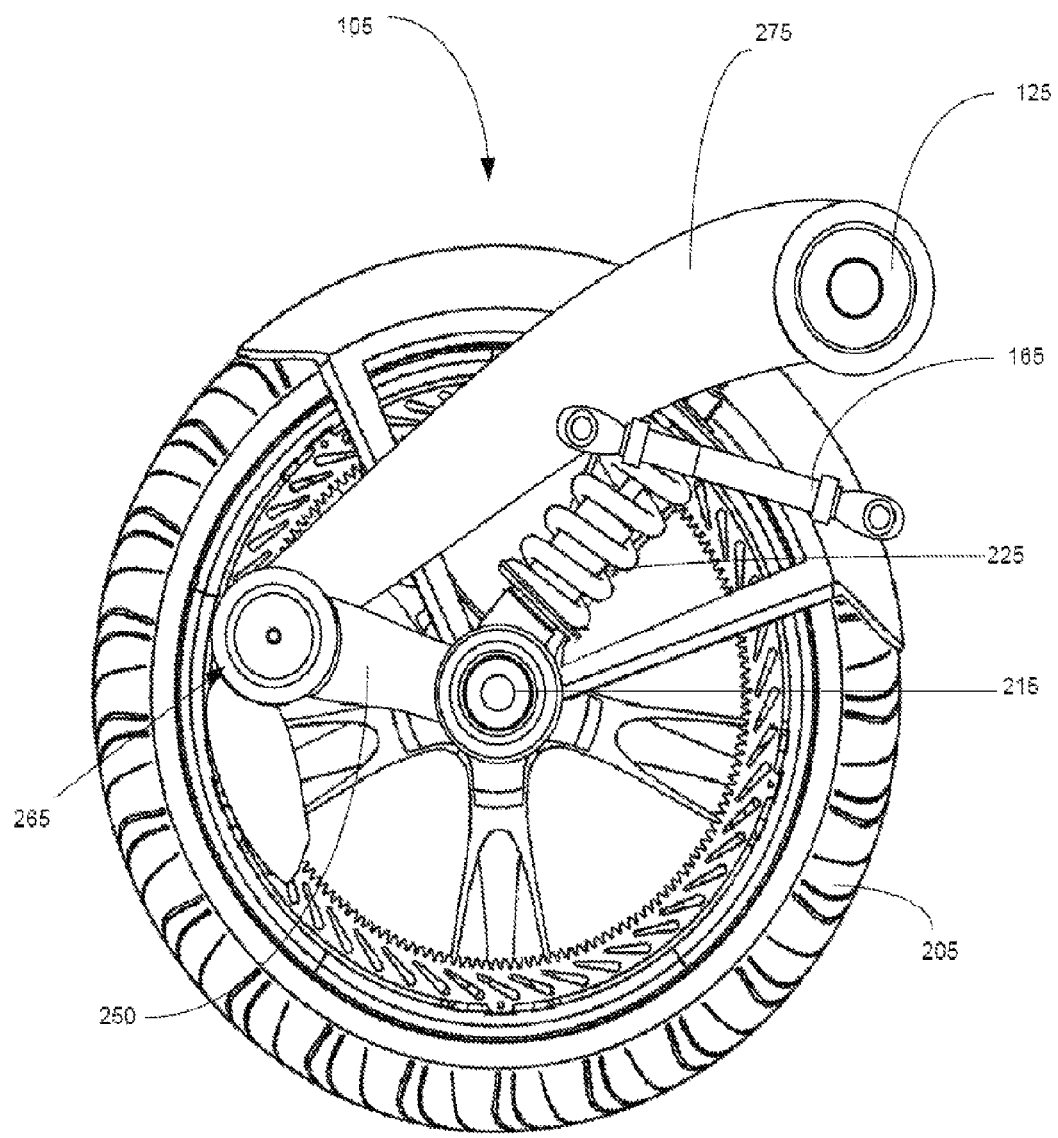

FIGS. 5D and 5E illustrate some embodiments in which the fifth link suspension mechanism 105 comprises a suspension arm 250 that is pivotally attached to the swing arm 135. Specifically, FIG. 5D shows an embodiment in which the suspension arm 250 has a first end portion 255 and a second end portion 260, wherein the first end portion 255 is pivotally attached at a second pivot joint 265 of the swing arm 135, near the swing arm's second end 270. FIG. 5D further shows that the wheel 205 is rotatably coupled to the suspension member through the use of an axle 215. To provide the wheel with its own independent suspension, FIG. 5D further shows that the extendable fifth linkage 225 extends from the second end portion 260 of the suspension arm 250 to the swing arm 135. Thus, as the wheel rolls down a surface (e.g., a road) with changing topography, the fifth link allows the suspension member to pivot with respect to the suspension arm and thereby help keep the wheel in contact with the surface.

FIG. 5E shows a representative embodiment in which the fifth link suspension mechanism 105 comprises a reverse swing arm 275. In particular, FIG. 5E shows that the swing arm 275 extends past the axle 215 to its second pivot joint 265, which is pivotally attached to the suspension arm 250. FIG. 5E further shows that while the wheel 205 is rotatably connected to the suspension arm 250 about the axle 215, the fifth linkage 225 extends from its pivotal attachment (not shown) on the swing arm 275 to the axle 215 (e.g., by connecting to a portion of the suspension arm 250). In this manner, fifth link suspension system mechanism allows the wheel connected to it to be independently suspended.

Lean Adjustment System

Many conventional cars that are designed to lean are also designed to have the car's lean angle be mechanically and directly linked to the car's turn proportion. This is usually fine for high speed turns, but can result in severe and unnatural leaning for low speed turns. In contrast to such conventional cars, some embodiments of the personal mobility vehicle 10 comprise a lean adjustment system, which allows two or more of the vehicle's wheels to lean and turn, without the lean angle always being fixed the vehicle's steering angle. In other words, some embodiments of the lean adjustment mechanism can change the ratio of a degree of lean to a degree of turn in order to adjust for the speed of the vehicle.

While the lean adjustment system can function in any suitable manner, in some embodiments, the lean adjustment system changes the angle of one or more wheels by altering the length or distance between two or more parts of the suspension mechanism. By way of non-limiting example, the lean adjustment mechanism can adjust the lean angle of one or more wheels by changing (e.g., increasing or decreasing) (1) the distance between the first pivot joint 125 of the swing arm 135 and the first pivot joint 170 of the support arm 165 and/or (2) by changing the length (e.g., shortening or lengthening) of the support arm or the swing arm.

The lean adjustment mechanism can function in any suitable manner. Indeed, in some non-limiting embodiments, the first end 160 of the support arm 165 and/or the horizontal member 110 is coupled to a movable connection point on the vehicle frame 115. In such embodiments, the movable connection point can be attached to one or more pistons, servos, linear actuators, knuckles, hydraulics, linkages, manual adjustment mechanisms, or other mechanisms that are capable of moving the connection point (e.g., up, down, back, forward, left, right, or otherwise) so as to change the distance between the first pivot joint 125 of the swing arm 135 and the first pivot joint 170 of the support arm 165.

In other embodiments, however, the length of the support arm 165 or the swing arm 135 changes to adjust the lean angle of one or more wheels 30 (e.g., by leaning, raising, and/or lowering the wheels). In this regard, the support arm and/or swing arm can comprise any suitable component that is capable of changing the length of the support arm or swing arm. Some non-limiting examples of such components include one or more pistons, linear actuators, or servos. By way of illustration, FIG. 6A shows a representative embodiment in which the support arm 165 comprises a hydraulic piston 280 that can shorten or lengthen on demand.

In order to show how the lean adjustment mechanism can function, FIG. 6B shows that when the swing arm's first pivot joint 125 is relatively close to the support arm's first pivot joint 170, the wheel 205 can have about a 50% lean and about a 50% turn. In contrast, FIG. 6C shows that when the sing arm's first pivot joint 125 is moved apart from the support arm's first pivot joint 170 (e.g., via movement of the movable connection member), the wheel 205 can have about a 10% lean and about a 90% turn. Additionally, FIG. 6D shows that when the length of the support arm 165 is increased, the wheel's lean and turn angle can be changed. For instance, FIG. 6D shows an embodiment in which the wheel 205 has a lean of about 70% and a turn or about 30%.

Where the personal mobility vehicle 10 comprises the lean adjustment system, the system can be actuated in any suitable manner. In one example, the system is actuated automatically or on the fly by a computer processor that determines the proper lean angle for the vehicle's wheels at various speeds and for various turn angles. In another example, the lean adjustment mechanism is actuated manually (e.g., through the use of a lever mechanism, a cable mechanism, or any other suitable mechanism that is capable of adjusting the lean angle of a wheel).

While the lean adjustment mechanism can help improve the comfort, stability, and control of the personal mobility vehicle 10, the lean adjustment mechanism can also perform a variety of other functions. By way of example, by lean adjustment mechanism can be used to individually raise or lower one or more of the vehicle's wheels (e.g., by or lengthening or shortening the support arm 165). In this manner, the lean adjustment system can lift one or more wheels to help the vehicle traverse obstacles in the vehicle's path.

Offset Hub-Motor Drive System

Some traditional drive systems have problems that can reduce a car or motorcycle's ability to hold the driving surface. In one example, some conventional hub-motor systems require the drive motor and other heavy components to be hard mounted to the axle of the wheel hub, thereby, increasing the unsprung mass of the wheel. This added mass can interfere with the wheel's ability to follow the topography of the road since wheels with higher mass are slower to respond to the input of the road surface and suspension dampeners.

In contrast, some embodiments of the offset hub motor system allow for the drive system (e.g., one or more motors or engines) to be mounted away from the wheel(s) that are being driven. In this manner, the mass or weight of the drive system in such embodiments of the personal mobility vehicle 10 is sprung by the vehicle fifth link suspension system 105, which is discussed above. As a result, the described offset hub motor system can reduce the vehicle's unsprung mass, thereby allowing it to have better handling and more consistent contact with the road surface.

As another example of a shortcoming associated with some drive systems is that many cars 15 and motorcycles transfer their body weight longitudinally as they accelerate or decelerate due to the freedom of movement provided by their suspension and the fulcrum of the drive wheel(s). This effect is most easily noted in rear drive vehicles with a high power-to-weight ratio, such as motorcycles and high-powered cars performing rapid acceleration, where acceleration generally transfers a vehicle's weight to its rear wheel(s). In some extreme cases, the weight is transferred to the rear wheel(s) sufficiently to lift the front wheel(s) off the ground (performing a "wheelie"), which is potentially catastrophic. Under less-extreme cases, as the weight of the front wheel(s) 30 of a conventional car 15 is reduced (as shown in FIG. 7 under Acceleration for a Prior Art Vehicle) the contact between the front wheel(s) 30 and the road surface 500 is likewise reduced. In such instances, vehicle handling, braking, and control can be adversely affected.

Under rapid deceleration, many conventional cars 15 and motor cycles transfer their weight longitudinally forward and on to the front wheel(s) 205 (as shown in FIG. 7 under Deceleration for a Prior Art Vehicle). This increased weight on the front wheels and decreased weight on the back wheels can reduce traction and control in the rear of the vehicle and can potentially cause the rear wheels to slip or even lift off the ground (performing a "fishtail" and/or a "stopy"). The body weight transfer caused by acceleration or deceleration can result in loss of traction to the wheel(s) being lifted and result in unpredictable handling and even total loss of vehicle control.

In contrast with many conventional cars 15 that tend to have their front ends lift as the cars rapidly accelerate and that tend to have their front ends dive as the cars rapidly decelerate, some embodiments of the personal mobility vehicle 10 include one or more offset hub motor systems that use the torque of the vehicles' drive system to counteract the natural longitudinally transfer of body weight. In this manner, the offset hub motor system can allow for a more equal distribution of weight on the wheels and more predictable vehicle handling characteristics during acceleration and deceleration.

FIG. 7 illustrates how the offset hub-motor system 285 counterbalances the natural weight transfer where the personal mobility vehicle 10 comprises a front wheel drive offset motor hub system as well as a front wheel drive and a rear wheel drive offset hub-motor system. Specifically, FIG. 7 shows that in some embodiments in which a spinning drive member 290 (such as a frictional wheel, a gear (e.g., a spur gear), or another mechanism that spins to cause a wheel 30 to turn) is pivotally connected to the wheel's axle 215 (e.g., via the swing arm 135 and/or suspension arm 250), the drive member is able to pivot (as shown by arrow 290) in a direction that is opposite to the rotational direction (as shown by arrow 300) of the wheel 30 that is accelerating.

Because the spinning drive member 290 is connected to a component of the suspension system (e.g., the swing arm 125 and/or the suspension arm 250), the pivotal movement of the drive member is able to apply a downward force to a front end of the personal mobility vehicle during acceleration, thereby, counteracting the natural body weight transfer associated with acceleration. On the other hand, FIG. 7 illustrates that, in some embodiments, as the vehicle 10 decelerates, the spinning drive member 290, which can slow the rotation of the wheel 30, is able to pivot in the same direction (as shown by arrow 305) as the rotational direction (as shown by arrow 300) of the decelerating wheel. As a result, the spinning drive member and the suspension system to which it is connected (e.g., the fifth link or any other suitable suspension mechanism) can force the front of the vehicle's body to lift—counteracting the natural dive tendency of braking. Thus, in at least some embodiments, the offset motor hub system 285 can lead to a more balanced and controlled ride during acceleration and deceleration. Accordingly, the offset motor hub system can keep the mass of the vehicle more balanced between each of the wheels, whether it the vehicle has 2, 3, 4, or more wheels.

Figure 8A:
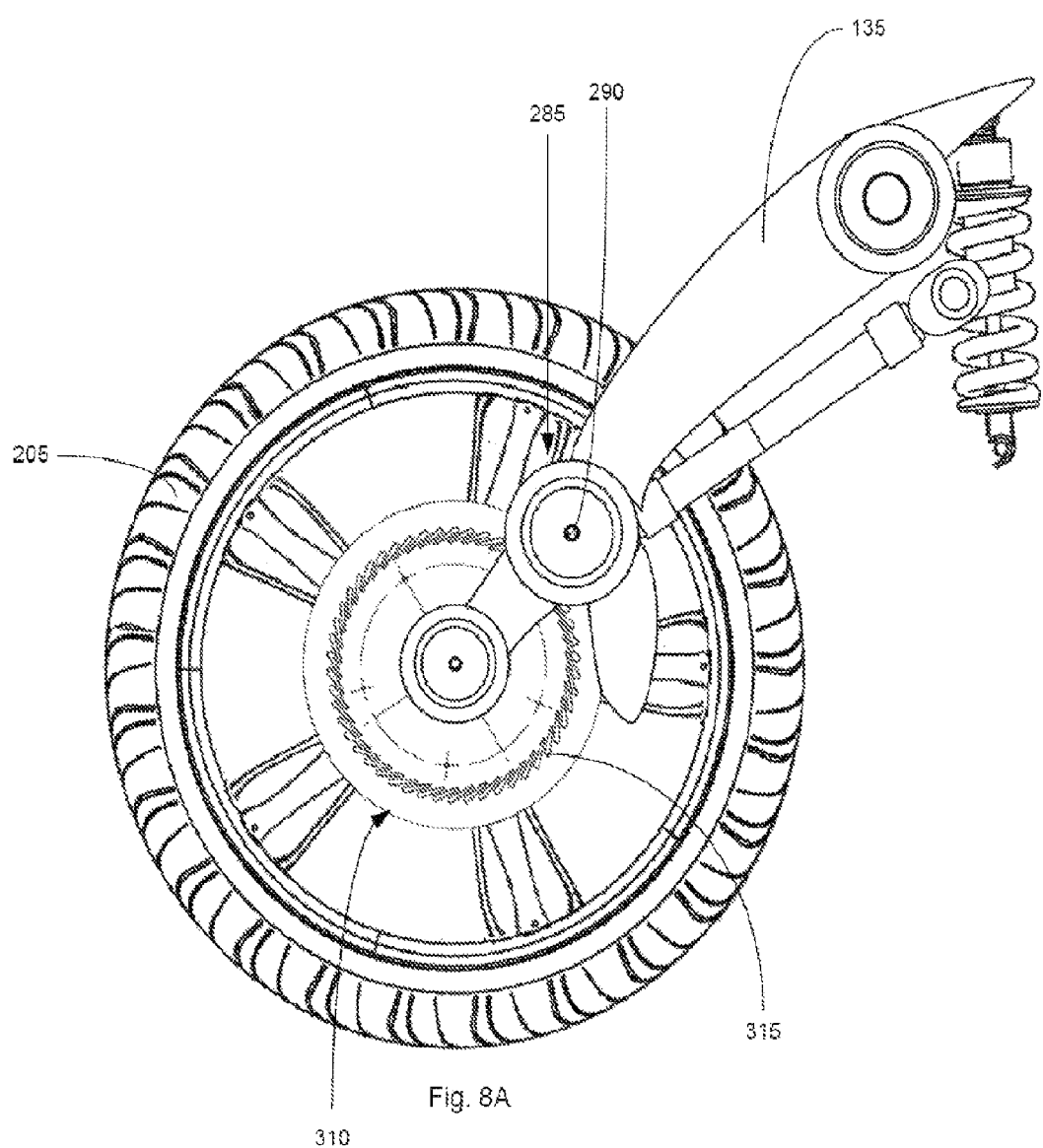
FIGS. 8A-8F depict side schematic views of some embodiments of the suspension mechanism comprising an offset motor hub system.

FIGS. 8A through 8H illustrate some non-limiting examples of suitable offset hub motor systems 285 and fifth link suspension mechanisms 105. In this regard, FIG. 8A shows a representative embodiment in which the spinning drive member 290 is attached to the swing arm 135, which is missing a second pivot joint) in order to spin a drive surface 310 (e.g., an inverted drive gear/brake disk 315) that is connected to the wheel 205.

Figure 8B:
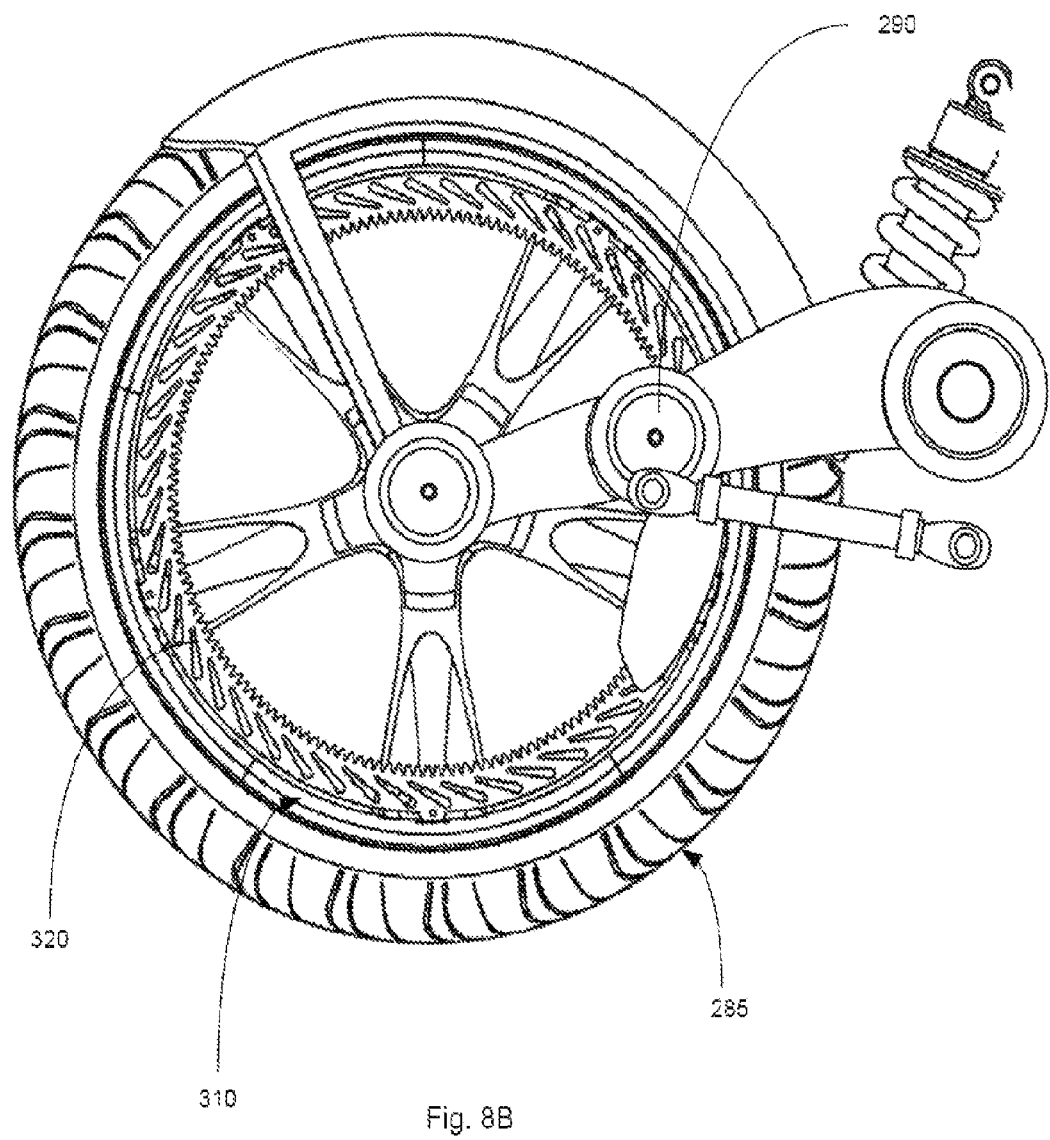

In contrast, FIG. 8B shows an embodiment in which the offset motor hub system 285 has the spinning drive member 290 attached to a swing arm 135, which is missing a second pivot joint, in order to spin a radial drive gear/disk break 320 that is serving as the drive surface 310.

Figure 8C:
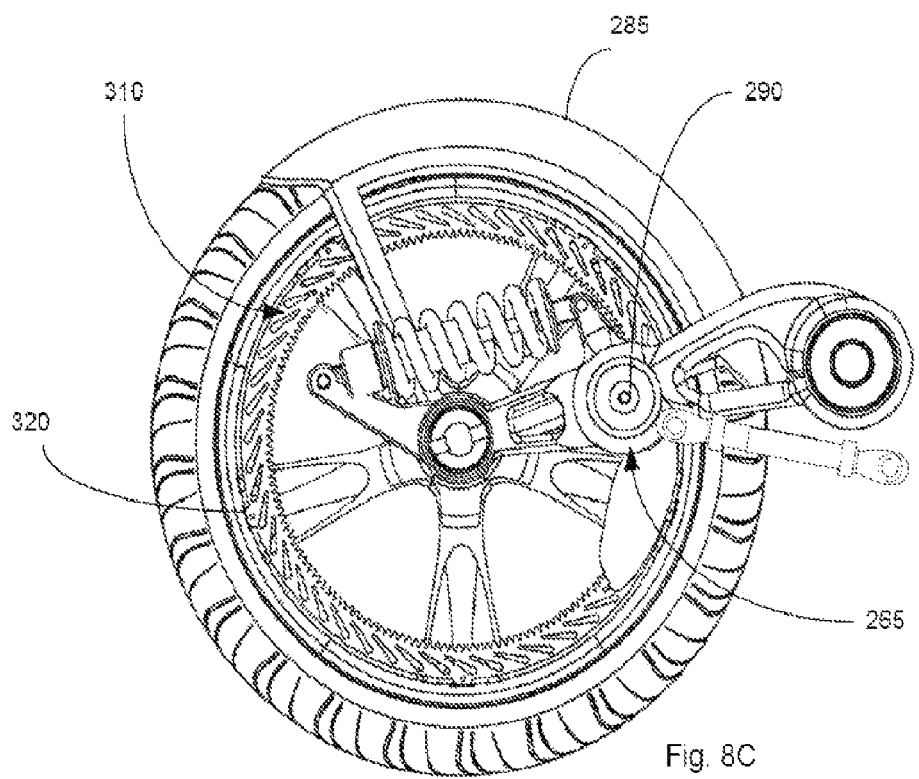
Figure 8D:
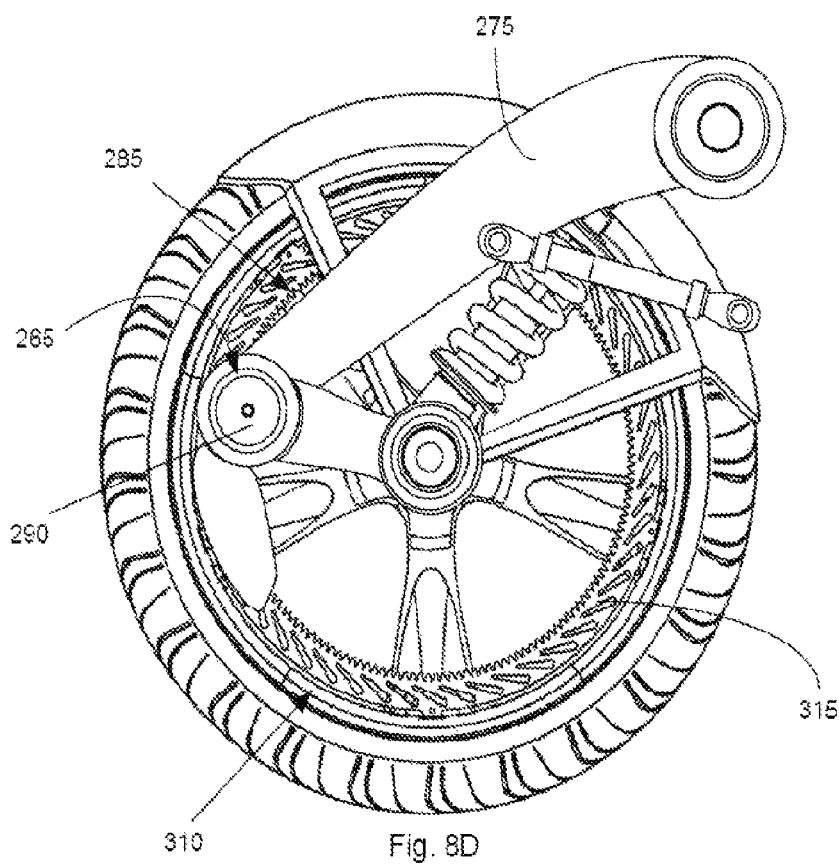
Figure 8E:
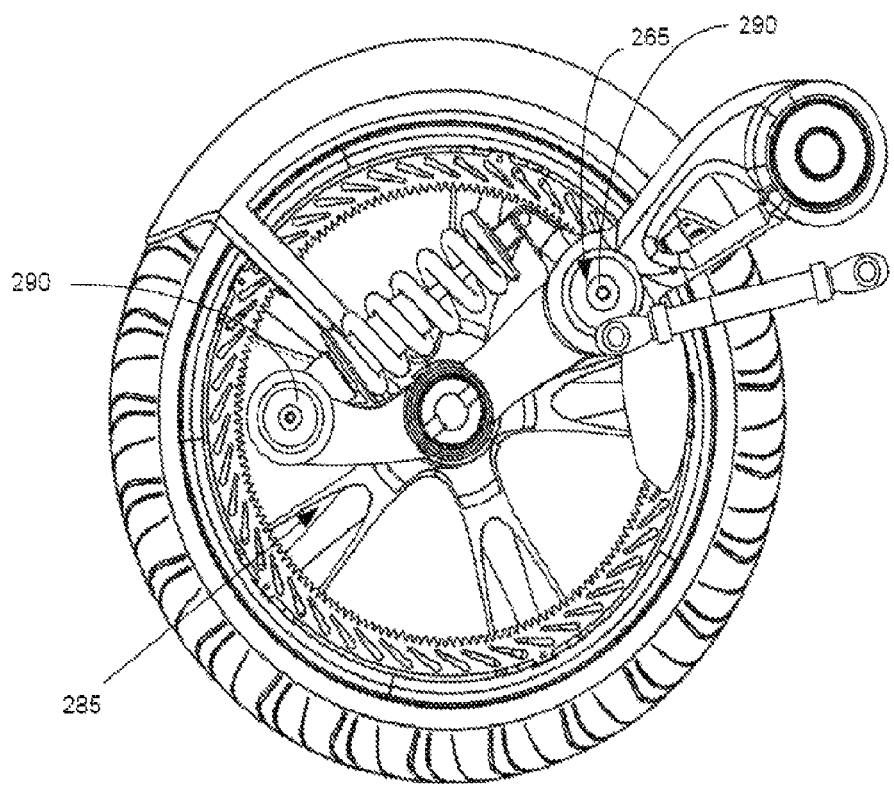
Figure 8F:
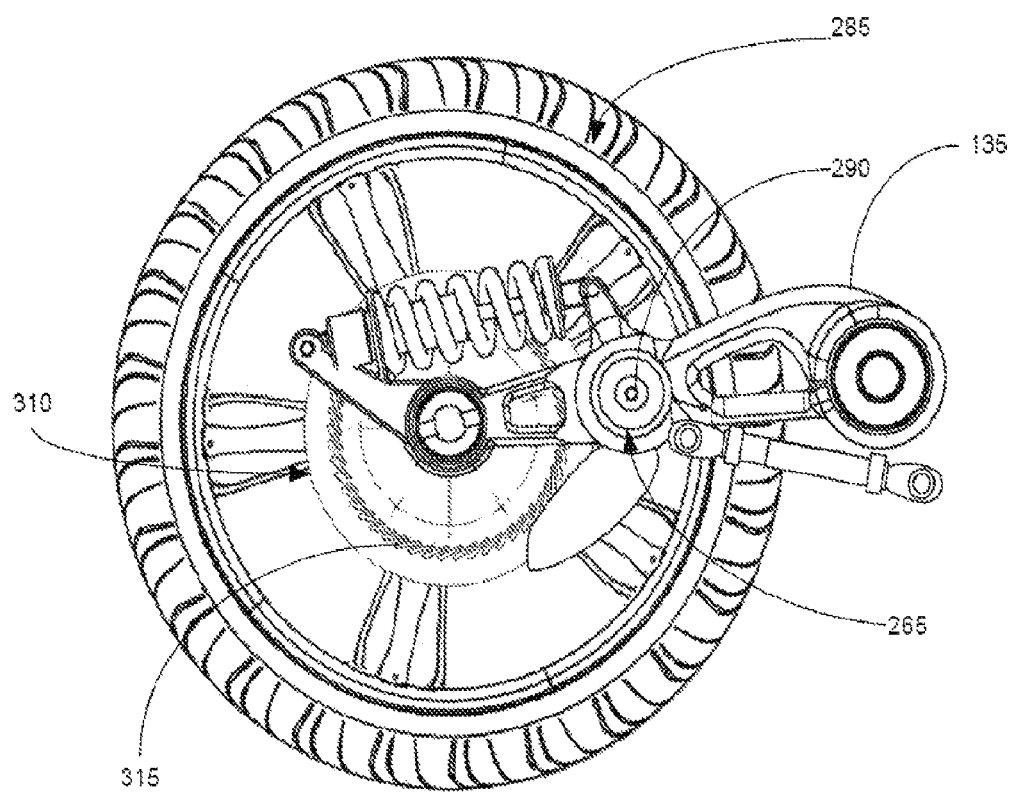
Figure 8G:
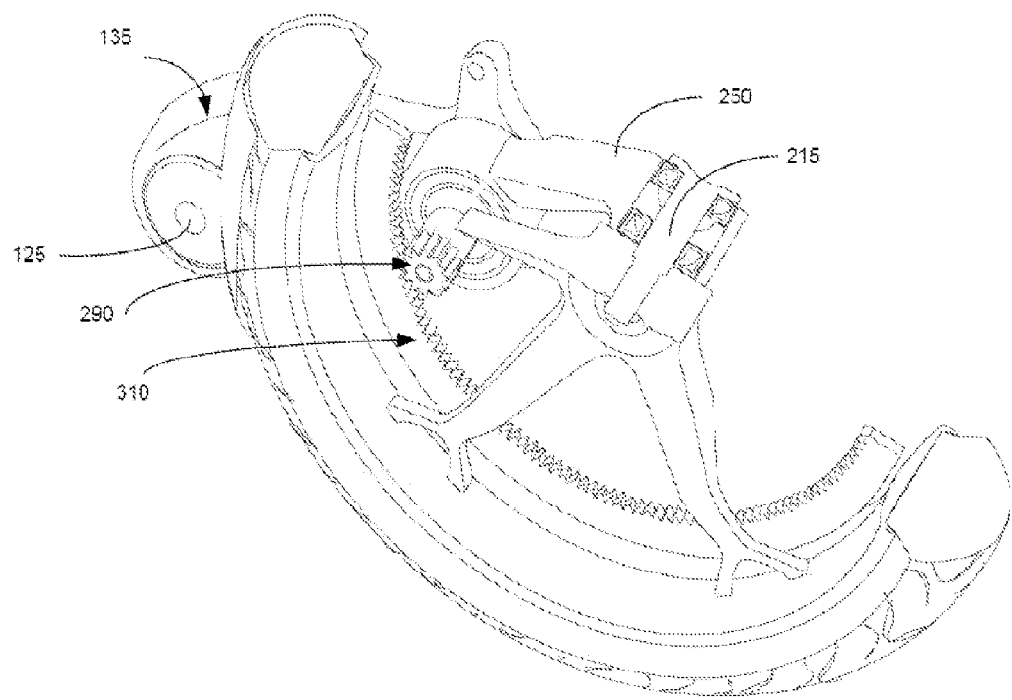
FIG. 8G depicts a perspective, cut away view of a representative embodiment of the offset hub motor system.
Figure 8H:
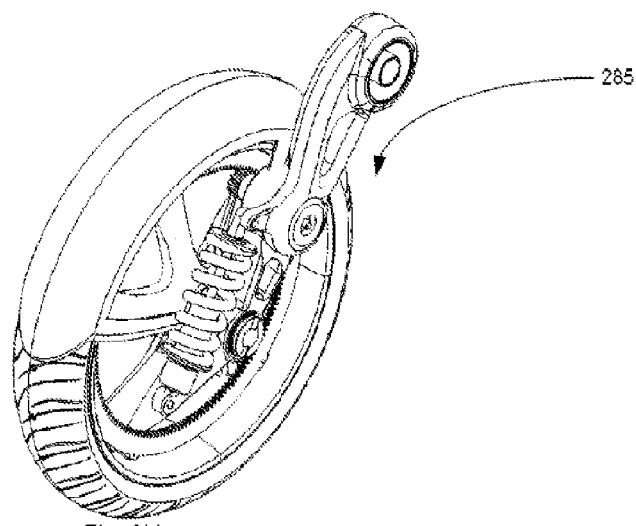
FIG. 8H depicts a perspective view of a representative embodiment of the offset hub motor system.

In still other embodiments, FIGS. 8C and 8D show the spinning drive member 290 is attached at the second pivot joint 265 of the swing arm 135 (275 in 8D) in order to drive a radial drive gear/disk brake 320. Along these lines, FIG. 8E shows that a first spinning drive member 290 can be attached at the second pivot joint 265 and/or a second spinning drive member 290 can be attached near the second end 260 of the suspension arm 250 to drive a radial drive gear/disk brake 320. Furthermore, FIG. 8F shows an embodiment in which the spinning drive member 290 is disposed at or near the second pivot of the swing arm 135 in order to drive an inverted drive gear/brake disk 315. For reference, some additional views of the offset motor hub system 285 are shown in FIGS. 8H and 8G.

Return to Neutral Lean Position Mechanism

As a general rule, a neutral position for a steering mechanism that allows for a straight, forward, and vertical alignment helps make steering a vehicle easier. Because, however, the personal mobility vehicle 10 leans and because some embodiments of the leaning mechanism permit gravity to pull the vehicle over to one side or the other, some embodiments of the vehicle comprises a return to neutral lean position mechanism that biases the horizontal member 110 towards a neutral, straight, and forward position.

The return to neutral lean position mechanism can function in any suitable manner that allows the allows the personal mobility vehicle 10 to return to a straight, forward, and vertical position as the vehicle comes out of a curve. In some embodiments, the return to neutral lean mechanism comprises a biasing mechanism that applies a biasing force to the horizontal member 110, which force biases the horizontal member towards a neutral position.

Figure 9A:
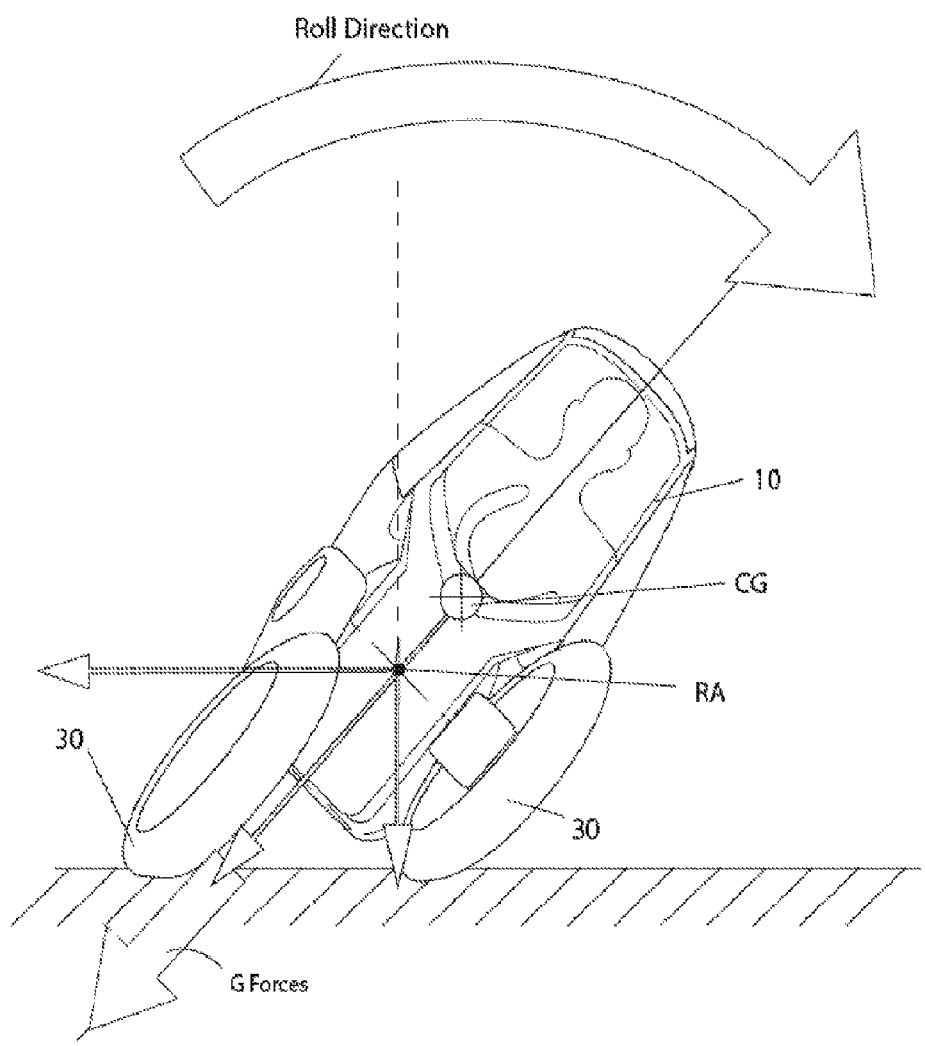
FIG. 9A shows a front schematic view of a representative embodiment of the personal mobility vehicle in which the vehicle's center of gravity serves as a biasing force to force the vehicle to a neutral steering position.
Figure 9B:
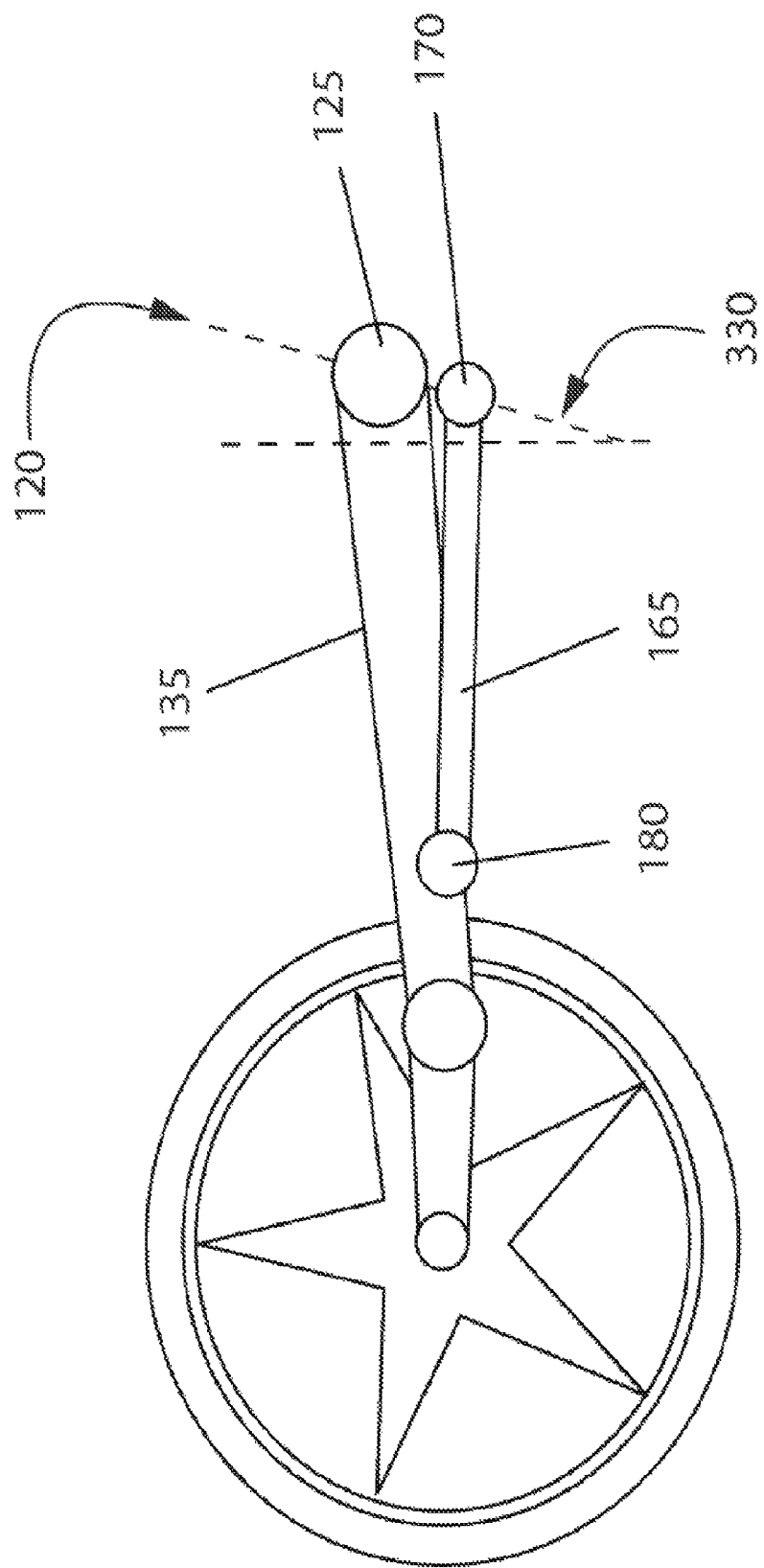

In one such example, FIG. 9A shows the weight of the vehicle 10 is substantially balanced in such a way the weight and center of gravity CG of the vehicle 10 act as a ballast or biasing force that helps return the vehicle to a neutral body position in which the wheels 30 face straight forward. Additionally, FIG. 9B shows a non-limiting example in which the biasing mechanism comprises a rake angle in the root axis 120 that causes the root axis the be angled towards the back or front of the vehicle 10. In this regard, a slight angle in the root axis can require a portion of the vehicle to lift when the vehicle turns. As a result, the neutral lean position mechanism can use the weight of the vehicle and gravity to help return the wheels 30 to the neutral position.

In another example of a suitable biasing mechanism, the return to neutral lean position mechanism includes, but is not limited to, one or more springs, servos, linear actuators, and/or pistons that can apply a neutral position biasing force to the horizontal member to bias that member towards the neutral position. By way of non-example, FIGS. 9C through 9E respectively show some embodiments in which the biasing mechanism 325 comprises two side springs 330, two horizontal springs 335, and two center springs 340 that apply a neutral biasing force to the horizontal member 110.

Differential System for a Leaning Vehicle

Figure 10:
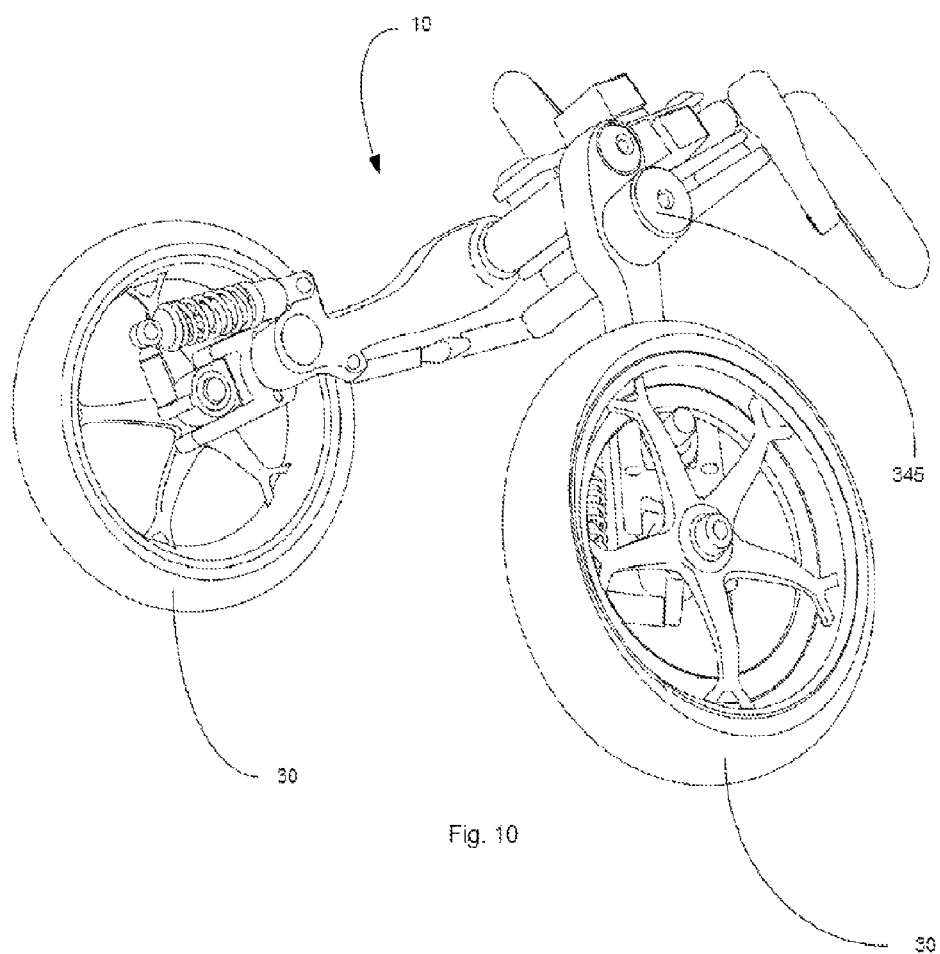
FIG. 10 depicts a perspective view of a representative embodiment of the personal mobility vehicle, wherein the vehicle comprises multiple motors to power separate wheels.
Figure 11A:
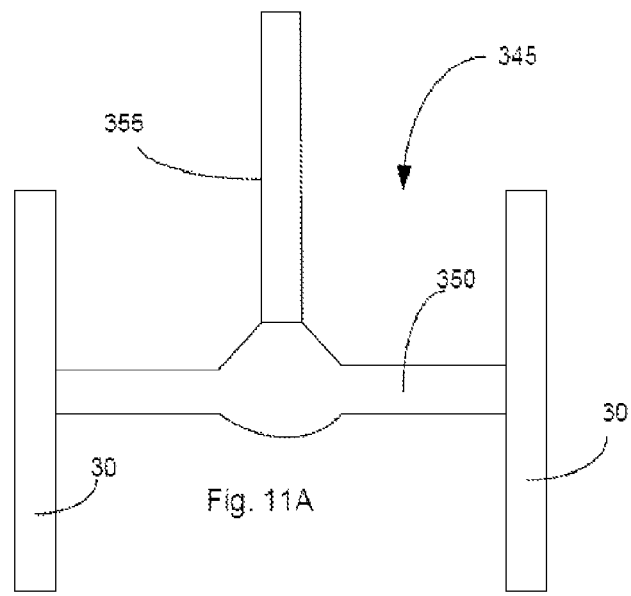
FIG. 11A depicts a top schematic view of a portion of a prior art drive train.
Figure 11B:
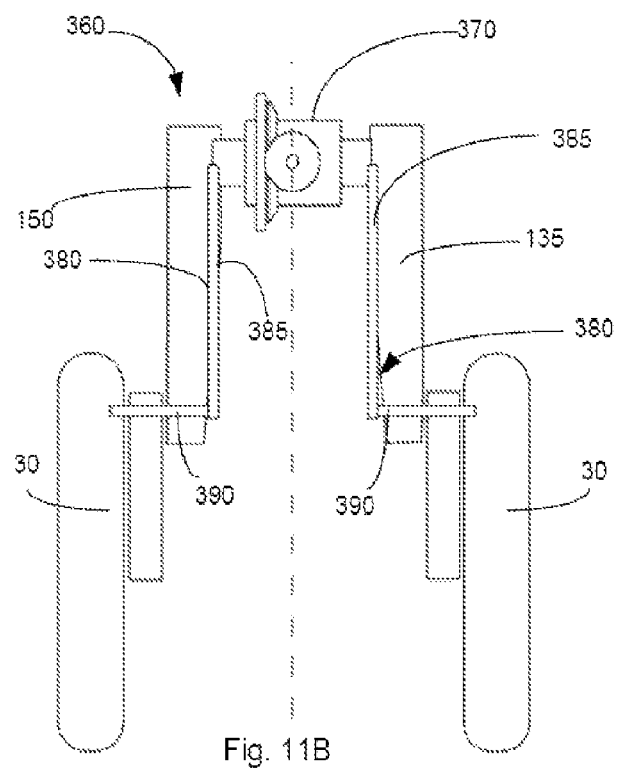
FIG. 11B depicts a top view of a representative embodiment of a differential system for a leanable vehicle.

In some embodiments, as illustrated in FIG. 10, separate wheels 30 of the personal mobility vehicle 10 are powered by separate drive mechanisms (e.g., separate motors 345 or engines). In other embodiments, however, the vehicle comprises a differential system that allows a single drive mechanism to power multiple wheels simultaneously. Unlike many conventional differentials 345 that (as shown in FIG. 11A) are configured to channel power to wheels 30 that are disposed at opposing ends of an axle 350 that runs substantially perpendicular to a drive shaft 355, the described differential system for a leaning vehicle is capable of providing power from one drive source to at least two wheels that are each disposed near a second end 220 of an elongated and independently suspended swing arm 135 (as illustrated in FIG. 11B). Additionally, unlike some conventional differentials that run substantially perpendicular to the length of the drive shaft, some embodiments of the described differential for a leaning vehicle are configured to allow the differential to rotate from left to right and vice versa, with respect to the length of the drive shaft.

While the described differential system can comprise any suitable characteristic, FIGS. 11A through 11D show some embodiments in which the differential system 360 for a leaning vehicle comprises a power intake mechanism 365 that is connected to a differential box 370, a connection mechanism 375 that is capable connecting the differential box to and causing it to rotate with the horizontal member 110, and one or more appendage drive shafts 380 that channel rotational power from the differential box to one or more wheels 30 disposed near an end of an elongated swing arm.

Figure 11C:
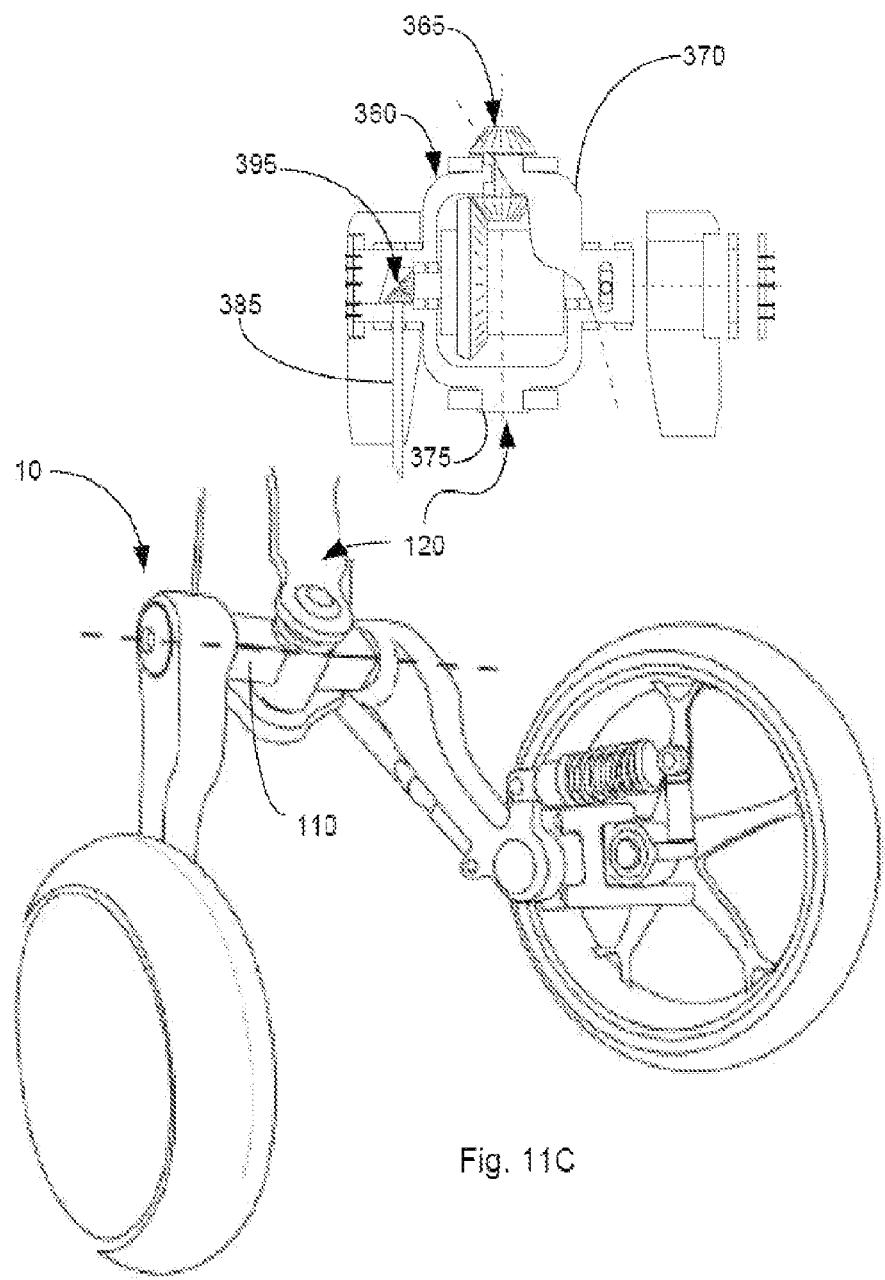
FIG. 11C depicts a side perspective view of a portion of the personal mobility vehicle and a front, partial-cutaway view of the described differential system.

The various components of the described differential system 360 can have any suitable characteristic that allows the differential system to function as described. By way of non-limiting example the power intake mechanism 365 can comprise a beveled gear, or any other component that is capable of transmitting rotational power from a drive shaft 355 as the differential box 370 rotates from side to side with the horizontal member 110. For instance, FIGS. 11C and 11D show some embodiments in which the power intake mechanism 365 comprises a beveled gear.

In another example, the connection mechanism 375 can comprise any mechanism that is capable of enslaving the rotational movement of the differential box 370 with the rotational movement of the horizontal member 110. In this regard, the connection mechanism can comprise a mount, bracket, or other mechanism that is capable of performing the described function.

In another example, the differential box 370 can comprise any suitable component that allows it to take rotational power from the drive shaft 355 and to channel that power to one or more of the appendage drive shafts 380. Indeed, some non-limiting examples the differential box can comprise a limited slip differential, an open differential, a positive traction differential, a spur gear differential, or any other new or known differential mechanism.

In still another example, the appendage drive shafts 380 can each comprise any suitable component that allows them to channel rotational power from the differential box 370 to one or more wheels 30 at the end of the described swing arms 135 and 150. In one non-limiting example, each appendage drive shaft comprises a flexible drive shaft that extends from the differential box to a corresponding wheel (e.g., on or through the swing arm or the support arm 165).

In another example, however, FIG. 11B shows that each appendage drive shaft 380 comprises a primary shaft 385 that is rotationally connected to the differential box 370 and a secondary shaft 390 that is rotationally connected to its corresponding primary shaft and wheel 30 (e.g., on or through the swing arm 135 or the support arm 165). In this regard, the primary shaft can be rotationally connected to the differential box and the secondary shaft (which can have the spinning drive member 290 at one end) in any suitable manner, including through the use of one or more beveled gears 395 (as shown in FIG. 11C) or any other mechanism that is capable of transferring the rotational power from the differential box to the wheels 30, even when the swing arms 135 and 150 are pivoting independently.

In addition to the aforementioned components and characteristics, the personal mobility vehicle 10 can comprise any other suitable component or characteristic. By way of non-limiting example, FIG. 12 shows a computer-generated rendering of the personal mobility vehicle 10 without a covering. In contrast, FIGS. 13 through 14B illustrate different views of the personal mobility vehicle 10 with a covering 400.

While specific embodiments and examples of the present invention have been illustrated and described, numerous modifications come to mind without significantly departing from the spirit of the invention, and the scope of protection is only limited by the scope of the accompanying claims.

The invention claimed is:

1. A personal mobility vehicle comprising:
a vehicle frame having multiple wheels connected thereto;
a horizontal member that is pivotally attached to the vehicle frame at a root axis to allow the horizontal member to rotate in a first plane of motion;
a first wheel connected to a first end of the horizontal member;
a second wheel connected to a second end of the horizontal member;
an offset hub motor system connected to at least one of the wheels;
a lean adjustment system connected to at least one of the wheels;
a return to neutral lean position mechanism connected to at least one of the wheel; and
a first fifth link suspension mechanism coupling at least one of the wheels to the vehicle frame, wherein the first fifth link suspension mechanism comprises:
a swing arm having a first pivot joint near its first end and a second pivot joint near its second end, wherein the first pivot joint is pivotally attached to the first end of the horizontal member;
a suspension arm having a first end portion and a second end portion, wherein the first end portion of the suspension arm is pivotally attached to the swing arm's second pivot joint, and wherein the first wheel is rotatably coupled to the suspension arm; and
an extendable fifth link connected to and extending between the second end portion of the suspension arm and the swing arm,
wherein the first wheel and the second wheel are substantially parallel to each other, wherein the second wheel leans and turns in harmony with the first wheel when the first wheel leans and turns, wherein the first fifth link suspension mechanism is attached to the first wheel, wherein a second fifth link suspension mechanism is attached to the second wheel, and wherein the first and the second fifth link suspension mechanisms each comprise a biasing member so the first and second wheels are suspended independently.

2. The vehicle of claim 1, wherein the personal mobility vehicle comprises a center of gravity that is disposed at or above a roll axis of the personal mobility vehicle.

3. The vehicle of claim 1, wherein the first fifth link suspension mechanism comprises a reverse swing arm.

4. The vehicle of claim 1, wherein the offset hub motor system comprises:
a drive surface connected to a first wheel; and
a spinning drive member in contact with the drive surface, wherein the spinning drive member is pivotally attached to an axle of the first wheel to allow the spinning drive member to rotate around the axle.

5. The vehicle of claim 4, wherein the spinning drive member is positioned so as to force the first fifth-link suspension to apply a diving force to a front end of the vehicle frame when the spinning drive member causes the first wheel to accelerate in a forward direction, or to force the first fifth-link suspension to apply a lifting force to the front end of the vehicle frame when the spinning drive member causes the first wheel to decelerate when the first wheel is moving in a forward motion.

6. The vehicle of claim 4, wherein the drive surface comprises a radial drive gear.

7. The vehicle of claim 4, wherein the drive surface comprises an inverted drive gear.

8. The vehicle of claim 4, wherein the spinning drive member is pivotally attached to the first wheel's axle so as pivot around the axle in a direction that is opposite to the rotational direction of the first wheel when the spinning drive member causes the first wheel to accelerate.

9. The vehicle of claim 4, wherein the spinning drive member is pivotally attached to the first wheel's axle so as pivot around the axle in the rotational direction of the first wheel when the first wheel is decelerating.

10. A personal mobility vehicle comprising:
a vehicle frame having multiple wheels connected thereto;
a horizontal member that is pivotally attached to the vehicle frame at a root axis to allow the horizontal member to rotate in a first plane of motion;
a first wheel connected to a first end of the horizontal member;
a second wheel connected to a second end of the horizontal member;
an offset hub motor system connected to at least one of the wheels;
a lean adjustment system connected to at least one of the wheels;
a return to neutral lean position mechanism connected to at least one of the wheel; and
first fifth link suspension mechanism coupling at least one of the wheels to the vehicle frame, wherein the first fifth link suspension mechanism comprises:
a swing arm having a pivot joint disposed near a first end of the swing arm, wherein the first wheel is rotatably connected to the swing arm near a second end of the swing arm, and wherein the pivot joint is pivotally connected to the first end of the horizontal member;
a support arm having a first end that is pivotally attached to the vehicle frame and a second end that is pivotally attached to the swing arm; and
an extendable fifth link connected to and extending between the swing arm and the vehicle frame,
wherein the first wheel and the second wheel are substantially parallel to each other, wherein the second wheel leans and turns in harmony with the first wheel when the first wheel leans and turns, wherein the first fifth link suspension mechanism is attached to the first wheel, wherein a second fifth link suspension mechanism is attached to the second wheel, and wherein the first and the second fifth link suspension mechanisms each comprise a biasing member so the first and second wheels are suspended independently.

11. The vehicle of claim 10, wherein a connection mechanism on the vehicle frame between the first end of the support arm and the pivot joint on the first end of the swing arm extends through the root axis and comprises a virtual link in the first fifth-link suspension mechanism.

12. The vehicle of claim 10, wherein the lean adjustment system comprises:
   the horizontal member;
   the swing arm; and
   the support arm, and
   wherein the first wheel leans when either a distance between the pivot joint of the swing arm and the first end pivotal attachment of the support arm changes, or when a length of the support arm changes.

13. The vehicle of claim 10, wherein the offset hub motor system comprises:
   a drive surface connected to a first wheel; and
   a spinning drive member in contact with the drive surface, wherein the spinning drive member is pivotally attached to an axle of the first wheel to allow the spinning drive member to rotate around the axle.

14. The vehicle of claim 13, wherein the spinning drive member is positioned so as to force the first fifth-link suspension to apply a diving force to a front end of the vehicle frame when the spinning drive member causes the first wheel to accelerate in a forward direction, or to force the first fifth-link suspension to apply a lifting force to the front end of the vehicle frame when the spinning drive member causes the first wheel to decelerate when the first wheel is moving in a forward motion.

15. A personal mobility vehicle comprising:
   a vehicle frame having multiple wheels connected thereto;
   a first fifth link suspension mechanism coupling at least one of the wheels to the vehicle frame;
   an offset hub motor system connected to at least one of the wheels;
   a lean adjustment system connected to at least one of the wheels; and
   a return to neutral lean position mechanism connected to at least one of the wheels, wherein the return to neutral lean position mechanism comprises:
      a horizontal member attached to the vehicle frame through a root pivot joint that allows the horizontal member to rotate in a first plane of motion;
      a first swing arm having its first end pivotally attached to a first end of the horizontal member;
      a second swing arm having its first end pivotally attached to a second end of the horizontal member, wherein the first swing arm and the second swing arm are able to pivot about the horizontal member in a second plane of motion that runs substantially perpendicular to the first plane of motion;
      a first support arm having its first end pivotally connected to the vehicle frame and its second end pivotally attached to the first swing arm;
      a second support arm having its first end pivotally connected to the vehicle frame and its second end pivotally attached to the second swing arm; and
      a biasing mechanism that applies a biasing force to the horizontal member, wherein the biasing force biases the horizontal member towards a neutral position.

16. The vehicle of claim 15, wherein the biasing mechanism is selected from a rake angle on the root pivot joint, a spring, a piston, a servo, and a linear actuator.

17. A personal mobility vehicle comprising:
   a vehicle frame having multiple wheels connected thereto;
   a first fifth link suspension mechanism coupling at least one of the wheels to the vehicle frame;
   an offset hub motor system connected to at least one of the wheels;
   a lean adjustment system connected to at least one of the wheels;
   a return to neutral lean position mechanism connected to at least one of the wheels; and
   a differential system for a leaning vehicle, wherein the system comprises:
      a motor drive shaft; and
      a differential box having a power intake mechanism in mechanical connection with the drive shaft;
      wherein the differential box is attached to a horizontal member on a vehicle, wherein the horizontal member is pivotally attached to the vehicle about a root axis so the differential box and the horizontal member are rotatable about the root axis, and with respect to the motor drive shaft.

18. The vehicle of claim 17, wherein:
   a first end of a first elongated swing arm is pivotally attached to a first end of the axle;
   a first end of a second elongated swing arm is pivotally attached to a second end of the horizontal member;
   the first and second swing arms are rotatable about an axis that runs substantially perpendicular to the root axis;
   a first wheel is attached at a second end of the first swing arm;
   a second wheel is attached at a second end of the second swing arm; and
   the differential system comprises a first appendage drive shaft mechanism extending between the differential box and the first wheel to provide rotational power to the first wheel.

* * * * *